(12) United States Patent
Sardaryan et al.

(10) Patent No.: US 10,268,847 B2
(45) Date of Patent: Apr. 23, 2019

(54) SYSTEM AND METHOD FOR REPURPOSING COMMUNICATION PORTS AS HOST INTERFACE OR DATA CARD CONNECTIONS

(71) Applicant: LDA Technologies Ltd., Mississauga (CA)

(72) Inventors: Sergey Sardaryan, Mississauga (CA); Mariya Sukiasyan, Mississauga (CA); Vahan Sardaryan, Mississauga (CA)

(73) Assignee: LDA TECHNOLOGIES LTD., Mississauga (CA)

(*) Notice: Subject to any disclaimer, the term of this patent is extended or adjusted under 35 U.S.C. 154(b) by 0 days.

(21) Appl. No.: 15/493,863

(22) Filed: Apr. 21, 2017

(65) Prior Publication Data

US 2017/0308499 A1 Oct. 26, 2017

Related U.S. Application Data

(60) Provisional application No. 62/325,614, filed on Apr. 21, 2016, provisional application No. 62/325,645, filed on Apr. 21, 2016.

(51) Int. Cl.
| | |
|---|---|
| *G06F 13/00* | (2006.01) |
| *G06K 7/04* | (2006.01) |
| *G06K 19/077* | (2006.01) |
| *G06F 1/08* | (2006.01) |
| *G06F 13/40* | (2006.01) |
| *G06F 13/42* | (2006.01) |

(52) U.S. Cl.
CPC ............. *G06K 7/042* (2013.01); *G06F 1/08* (2013.01); *G06F 13/4022* (2013.01); *G06F 13/4068* (2013.01); *G06F 13/4282* (2013.01); *G06K 19/07732* (2013.01); *G06F 2213/0026* (2013.01)

(58) Field of Classification Search
CPC .... G06F 13/4282; G06F 13/4022; G06F 1/08; G06F 13/4068; G06F 2213/0026
See application file for complete search history.

(56) References Cited

U.S. PATENT DOCUMENTS

| | | | |
|---|---|---|---|
| 6,209,050 B1* | 3/2001 | Iho | G06F 9/4411 710/105 |
| 2008/0065805 A1* | 3/2008 | Wu | G06F 1/186 710/301 |
| 2011/0068171 A1* | 3/2011 | Hsieh | G06K 7/0004 235/380 |
| 2012/0185674 A1* | 7/2012 | Taylor | H03K 19/177 712/37 |
| 2012/0187564 A1* | 7/2012 | Tsuge | H01L 23/49822 257/773 |
| 2014/0218379 A1* | 8/2014 | Jia | G06T 1/20 345/520 |
| 2015/0131993 A1* | 5/2015 | Lutgen | G02B 6/00 398/58 |

* cited by examiner

*Primary Examiner* — Jing-Yih Shyu
(74) *Attorney, Agent, or Firm* — Bereskin & Parr LLP/S.E.N.C.R.L., s.r.l.

(57) ABSTRACT

A data card enclosure method and system comprising data card connectors and host interface connectors on a data card housed in the data card enclosure. The data card enclosure method and system provided for connecting the data card connectors and host interface connectors to external communications ports. One or more of the data card connectors may be repurposed as one or more host interface connections or one or more of the host interface connectors may be repurposed as one or more data card connectors.

18 Claims, 18 Drawing Sheets

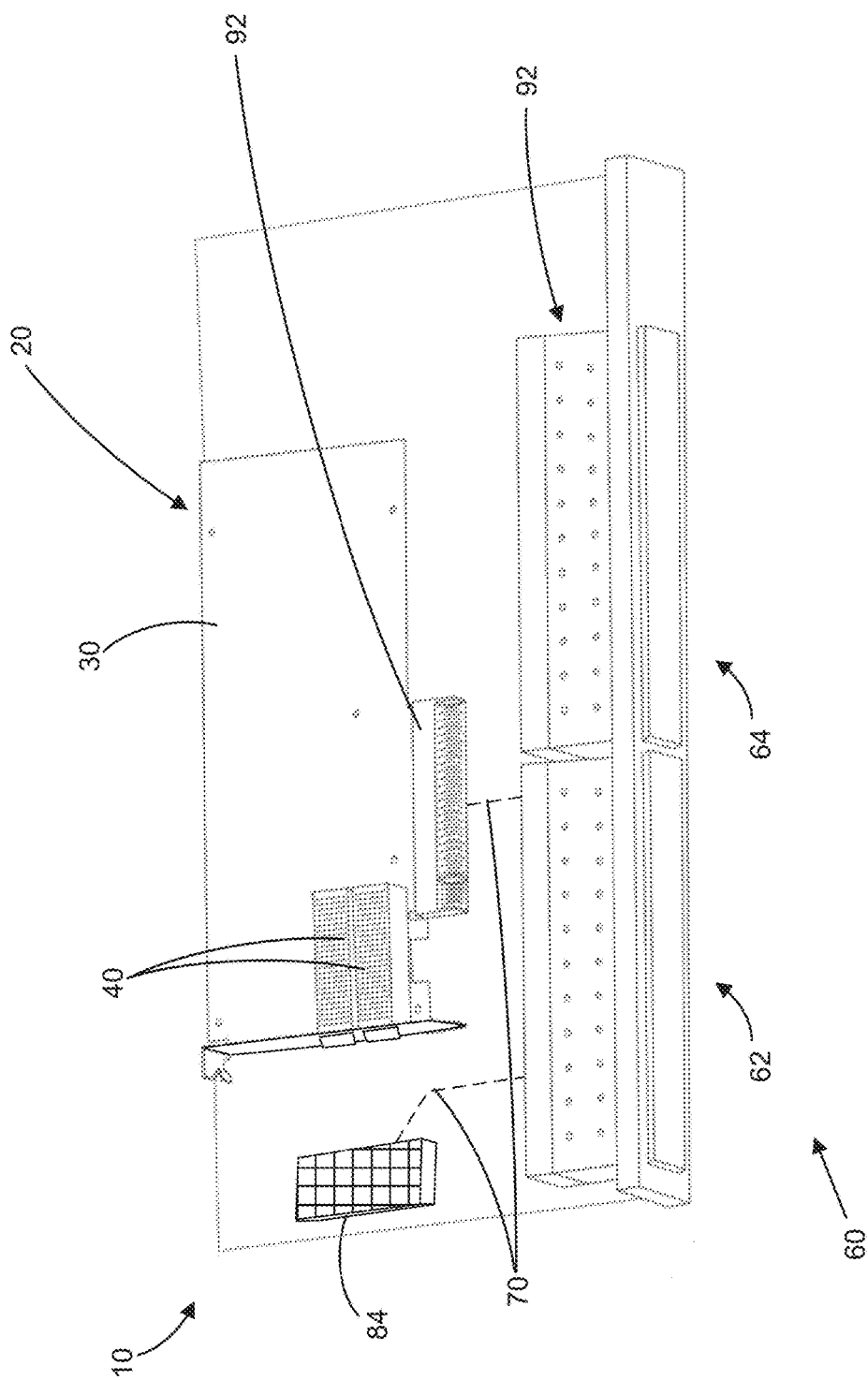

| 10G-s4/show interface p1-16 transceiver | | | |
|---|---|---|---|
| Port Name | Manufacturer | Model | Speed (Mbit/s) | Connector Type |
| P1 | FINISAR CORP. | FTLX057D3BCL-SM | 10000 | LC |
| P2 | FINISAR CORP. | FTLX857D3BNL-E4 | 10000 | LC |
| P3 | FINISAR CORP. | FTLX057D5XTL-S5 | 10000 | LC |
| P4 | FINISAR CORP. | FTLX8571D3BCL-BM | 10000 | LC |

SYSTEM AND METHOD FOR REPURPOSING COMMUNICATION PORTS AS HOST INTERFACE OR DATA CARD CONNECTIONS

RELATED APPLICATIONS

This application claims priority from the U.S. provisional patent application Nos. 62/325,614, filed on Apr. 21, 2016 entitled "CIRCUIT BOARD ENCLOSURE FOR COMMUNICATIONS APPLICATIONS"; and 62/325,645, filed on Apr. 21, 2016 entitled "SYSTEM AND METHOD TO REPURPOSE COMMUNICATION PORTS", the disclosures of which are incorporated herein, in their entirety, by reference.

FIELD

The described embodiments and aspects relate to systems and methods of repurposing communication ports of a data card.

BACKGROUND

Data cards, such as those containing Field Programmable Gate Array (FPGA) devices, may be used in various applications including networking applications.

Data cards may be provided in the form of a computer expansion card, and may include PCI-Express or PCIe compliant bus interface pluggable into the motherboard of a computer for power and data exchange. These boards may include a number of input and output connections, including edge connectors for interfacing with a host device and physical communication interfaces such as RJ45 Ethernet and connectors for Quad Small Form-factor Pluggable (QSFP) transceivers for high speed serial data links to other nodes within a network (e.g. switch, router, server, etc.).

In some applications, it may be advantageous to use underutilized host interface connectors as serial data links.

SUMMARY

In an embodiment of the present invention there is a method of using a signal line of a data card, the signal line being configured to carry data card signals provided by the data card, the data card signals being compatible with a first signalling standard. The method may comprise determining an external device for connecting to the data card using the signal line, the external device being configured to provide device signals compliant with a second signalling standard such that the data card signals compatible with the first signalling standard are not readable by the external device and device signals compliant with the second signalling standard are not readable by the data card when received via the signal line. The method may comprise converting the data card signals carried by the signal line to be new data card signals compliant with the second signalling standard and readable by the external device. The method may comprise connecting the signal line as a data link for communication between the data card and the external device. The method may comprise operating the signal line of the data card in compliance with the second signalling standard to carry the new data card signals such that the new data card signals communicated to the external device are compliant with the second signalling standard and are readable by the external device.

In some embodiments, converting the data card signals carried by the signal line to the new data card signals comprises determining a first set of clock frequencies compatible with the first signalling standard, the data card signals being synchronized to a signal line clock frequency within the first set of clock frequencies; determining a second set of clock frequencies compliant with the second signalling standard, the external device being configured to operate at a device clock frequency within the second set of clock frequencies, the device clock frequency being different from the signal line clock frequency; determining a reference clock frequency, the reference clock frequency being common to both the first set of clock frequencies and the second set of clock frequencies; and, based on the reference clock frequency, converting the data card signals carried by the signal line to the new data card signals compliant with the second signalling standard.

In some embodiments, converting the data card signals carried by the signal line to the new data card signals comprises selecting a frequency i) common to both the first set of clock frequencies and the second set of clock frequencies, and ii) closest to the signal line clock frequency, to be the reference clock frequency.

In some embodiments, converting the data card signals carried by the signal line to the new data card signals comprises connecting to the data card a feed clock external to the data card to synchronize the new data card signals to reference clock frequency.

In some embodiments, the signal line comprises a PCI Express signal line and the first signalling standard is PCI Express for high-speed data bus communication between the data card and a host device.

In some embodiments, the feed clock is connected to the data card through a PCI Express interface that connects the data card and the host device.

In some embodiments, the second signaling standard is Ethernet.

In some embodiments, converting the data card signals carried by the signal line to be new data card signals comprises, for each signal line in a plurality of signal lines provided by the data card that is configured to be compatible with a corresponding signalling standard, determining, a corresponding first set of clock frequencies compatible with the corresponding signalling standard and a corresponding signal line frequency within the first set of clock frequencies used for that signal line; determining a second set of clock frequencies compliant with the second signalling standard, the external device being configured to operate at a device clock frequency within the second set of clock frequencies; selecting the signal line out of the plurality of signal lines, the signal line being selected based on a respective first set of clock frequencies and the device clock frequency; determining a reference clock frequency, the reference clock frequency being common to both the respective first set of clock frequencies and the second set of clock frequencies; and, based on the reference clock frequency, converting the data card signals carried by the signal line to the new data card signals compliant with the second signalling standard.

In some embodiments, converting the data card signals carried by the signal line to the new data card signals comprises selecting a frequency i) common to both the first set of clock frequencies and the second set of clock frequencies, and ii) closest to the signal line clock frequency, to be the reference clock frequency.

In some embodiments, converting the data card signals carried by the signal line to be the new data card signals compliant with the second signalling standard and readable by the external device comprises configuring a field-programmable gate array (FPGA) provided on the data card to convert the data card signals to the new data card signals compliant with the second signalling standard.

In some embodiments, the external device is an Ethernet-compliant device being driven by an external device reference clock operating at an Ethernet frequency; the second signalling standard is, and the first signalling standard is not, an Ethernet signalling standard; the data card signals according to the first signalling standard are synchronized to a signal line clock frequency different from the Ethernet frequency; and converting the data card signals carried by the signal line to the new data card signals comprises converting the signal line clock frequency to the Ethernet frequency to synchronize the new data card signals to the Ethernet frequency.

In an embodiment of the present invention there is a device for using a signal line in a plurality of signal lines of a data card, the device comprising at least one data card attachment for connecting to the signal line in the plurality of signal lines of the data card, and for connecting the signal line to an external device; and a signal generator for generating a configuration signal, provided to the data card via the at least one data card attachment, to configure the data card to communicate with the external device through the signal line.

In some embodiments, the device further comprises a user interface electronically linked to the at least one data card attachment for receiving an input from a user of the data card to control the signal generator, wherein the data card is configured to operate the signal line at a signal line frequency within a first set of clock frequencies; the external device is configured to operate at a device clock frequency within a second set of clock frequencies; and the interface comprises a frequency control for determining the configuration signal provided to the data card via the at least one data card attachment to adjust the signal line clock frequency to correspond to a reference clock frequency, the reference clock frequency being a clock frequency common to both the first set of clock frequencies and the second set of clock frequencies.

In some embodiments, the signal generator is a clock source operable to generate the configuration signal, the configuration signal being a feed clock signal providable to the data card via the at least one data card attachment, and the clock source being adjustable to provide the feed clock signal at a plurality of different clock source frequencies including the reference clock frequency.

In some embodiments, the signal line comprises a PCI Express signal line and the first signalling standard is PCI Express for high-speed data bus communication between the data card and a data card host; and the at least one data card attachment comprises i) a PCI Express interface for connecting to the PCI Express signal line; and ii) a feed clock signal line separate from the PCI Express signal line for providing the feed clock signal to the data card.

In some embodiments, the device further comprises an interface electronically linked to the external device for determining a second signalling standard, the external device being configured to provide and read signals compliant with the second signalling standard, the interface being further electronically linked to control the signal generator, wherein the interface is operable to automatically determine the second signalling standard from the external device, and to control the signal generator to generate the configuration signal based on the second signalling standard.

In some embodiments, the external device is an Ethernet-compliant device being driven by an external device reference clock operating at an Ethernet frequency; the configuration signal is a feed clock signal providable to the data card via the at least one data card attachment; and the signal generator is a clock source operable to generate the feed clock at a frequency corresponding to the Ethernet frequency to enable communication between the data card and the external device.

In some embodiments, the at least one data card attachment is provided in an interior space of a data card enclosure, the at least one data card attachment is connected to at least one external communication port on an exterior of the enclosure such that the external device is connected to the signal line via a corresponding external communication port and a corresponding data card attachment.

In some embodiments, the at least one data card attachment comprises a data card receptacle provided on a first edge of a data card extender, the data card has at least one data card extender port disposed on a second edge that is oriented at least 90° relative to the first edge, and the data card receptacle is operable to connect to a set of signal lines associated with a plurality of edge connectors of the data card.

In some embodiments, the data card extender couples the at least one data card extender port to a set of outgoing signal lines in the set of signal lines associated with the data card edge connectors such that all remaining signal lines in the set of signal lines associated with the data card edge connectors are selectable as the signal line used for the data card to communicate with the external device.

In some embodiments, the device further comprises a user interface electronically linked to the at least one data card attachment for receiving an input from a user of the data card to control the signal generator, wherein the data card is configured to operate the signal line at a first signalling standard; the external device is configured to operate at a second signalling standard different from the first signalling standard; and the interface comprises a standard control for determining the configuration signal provided to the data card via the at least one data card attachment to convert the signal line to operate at the second signalling standard.

These and other embodiments of the invention may be more readily understood with the aid of the illustrative Figures and detailed description included below.

BRIEF DESCRIPTION OF THE DRAWINGS

Embodiments of the present invention will now be described in detail with reference to the figures, in which:

FIG. 3A is a top view of a circuit board enclosure according to an aspect of the present invention;

FIG. 13 is a depiction of a portion of a user interface according to an aspect of the present invention;

FIG. 14 is a depiction of a portion of a user interface according to an aspect of the present invention;

DETAILED DESCRIPTION OF EXEMPLARY EMBODIMENTS AND ASPECTS

Figure 1A:
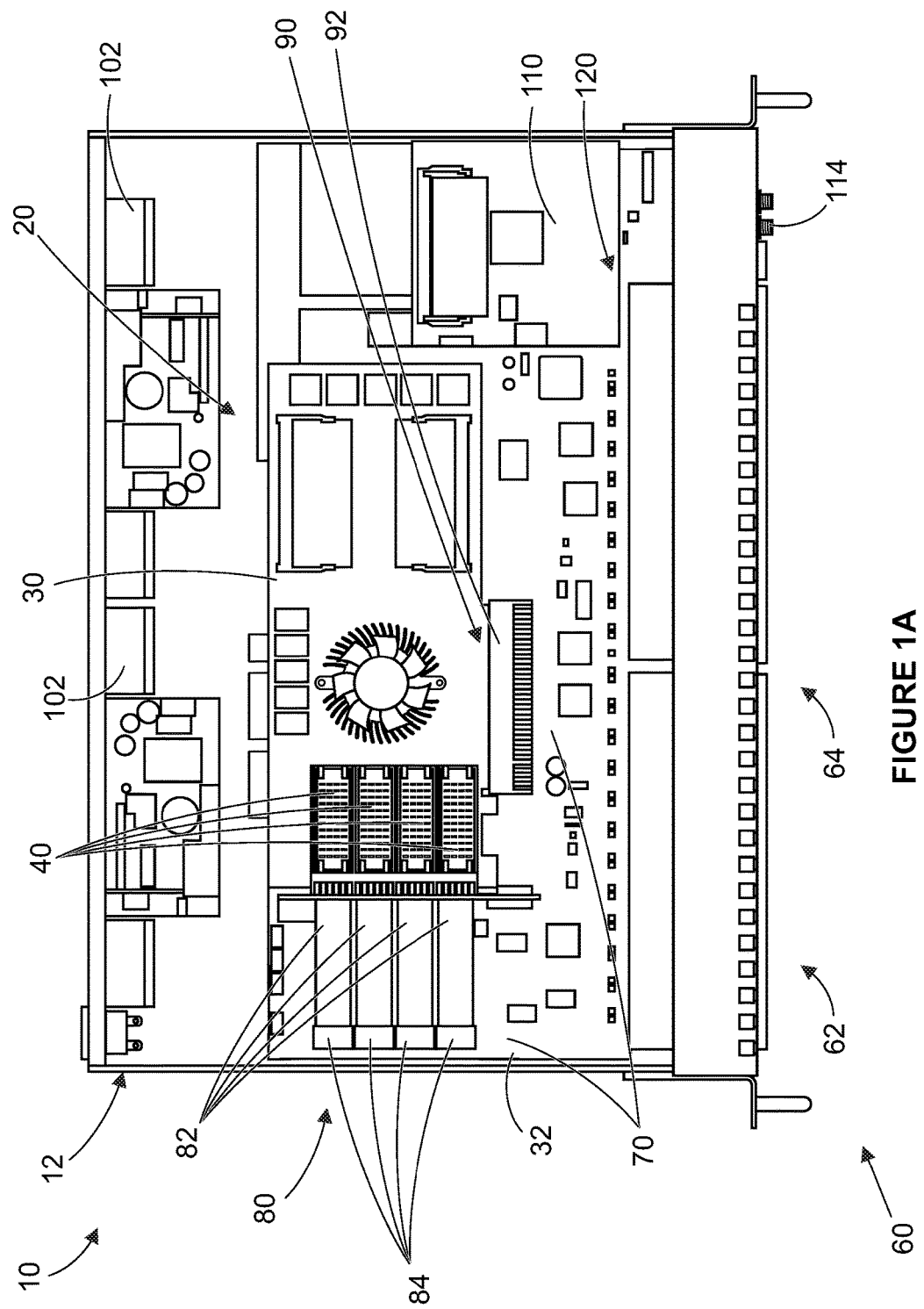
FIG. 1A is a top view of a circuit board enclosure hosting a data card according to an aspect of the present invention.

The embodiments and aspects of the systems and methods described herein may be implemented in hardware or software, or a combination of both. Some embodiments and aspects may be implemented in, or may interface with, computer programs executing on programmable computers, each computer including at least one processor, a data storage system (including volatile memory or non-volatile memory or other data storage elements or a combination thereof), and at least one communication interface.

Program code may be applied to data to perform the functions described herein and to generate information. The information may be applied to one or more devices, in known fashion.

Some embodiments and aspects may be implemented in a high level procedural or object oriented programming or scripting language, or both, to communicate with a computer system. Alternatively, some embodiments and aspects may be implemented in assembly or machine language, if desired. The language may be a compiled or interpreted language. Each such embodiment and aspect may be stored on a storage media or a device (e.g., ROM, magnetic disk, optical disc), readable by a general or special purpose programmable computer, for configuring and operating the computer when the storage media or device is read by the computer to perform the procedures described herein. Embodiments and aspects of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments and aspects may be distributed in a computer program product including a physical, non-transitory computer readable medium that bears computer usable instructions for one or more processors. The medium may be provided in various forms, including one or more diskettes, compact disks, tapes, chips, magnetic and electronic storage media, and the like. Non-transitory computer-readable media comprise all computer-readable media, with the exception being a transitory, propagating signal. The term non-transitory is not intended to exclude computer readable media such as a volatile memory or RAM, where the data stored thereon is only temporarily stored. The computer useable instructions may also be in various forms, including compiled and non-compiled code.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments and aspects described herein. However, it will be understood by those of ordinary skill in the art that the embodiments and aspects described herein may be practiced without these specific details. In other instances, well-known methods, procedures and components have not been described in detail so as not to obscure the embodiments and aspects described herein. Also, this description and the drawings are not to be considered as limiting the scope of the embodiments and aspects described herein in any way, but rather as merely describing an implementation of the various embodiments and aspects described herein.

In networking applications, specialized computing devices may be installed within a network node to accelerate or provide specialized tasks. For example, devices may be provided on the network to receive data from other nodes for data encryption/decryption, networking status monitoring (e.g. deep packet monitoring), data analysis (e.g. statistical analysis of financial data and image processing) and carrying out low-latency transactions (e.g. high frequency trading). Specialized processing may be carried out using processors such as Graphics Processing Units (GPUs) or programming logic such as Field Programmable Gate Arrays (FPGAs).

Such specialized devices may generally be provided in the form of a data card such as a computer expansion card installable into an interface of a computer. To provide high-speed data transfer between the host computer and the network (including the "outside" world) the data card may have a number of interfaces. For example the data card may include host interface connectors with appropriate connections to interface with the host computer. For example, PCI Express (PCIe) protocol can be used. The data card may contain other types of data card connectors including USB, SATA, SFP, or QSFP interfaces for network communication.

Depending on the choice of communication standard employed and the bandwidths required, the number of PCIe links available on the data card needed for a card-to-motherboard communication (i.e. via the host interface connectors) can vary. Some networking applications may rely on PCIe links for configuration purposes only so that PCIe bandwidth may not be a critical factor for network operation. For instance, if the data card contains programmable devices, such as a Field Programmable Gate Array (FPGA), data card configuration can refer to providing programming to the FPGA. However many networking applications, such as high frequency trading, can benefit from making an increased number of network links available. As such, a method of using PCIe links on the data card as high-speed network links to provide high-speed communication links that may pass through the data card and be accessible via a device on the network can be advantageous.

Described in the present disclosure are various embodiments in which a data card may be provided having data card connections and host interface connections, and for which one or more of the data card connections may be repurposed as one or more host interface connections, or one or more of the host interface connections may be repurposed as one or more data card connections. This may enable unused or underused connections to be repurposed for greater use.

A variety of embodiments may be used to provide convenient access to repurposed ports.

Some embodiments of the present invention utilize a data card enclosure, which may provide convenient access to both the data card connections and host interface connections, one or more of which may not have otherwise been accessible via external communication ports.

Reference is now made to FIGS. 1 to 8, in which a data card enclosure 10 is depicted in accordance with an aspect of an embodiment of the present invention. Data card enclosure 10 comprises a data card enclosure housing 12, defining an interior space.

The data card enclosure housing 12 can house a data card 20. The data card 20 may be a computer expansion card connectable to an expansion slot provided by the motherboard of a computer. The data card generally comprises a printed circuit board (PCB) 30, with various components such as input/output interfaces, memory, and processors. For example, in the present case, the processor of the data card 20 may be a field programmable gate array (FPGA). The printed circuit board has disposed thereon data card connections 40 and host interface connections 50. The host interface connectors 50 can be configured to interface with an internal data bus of a host computer system to transfer data between the data card and host computer system. In the case of a computer expansion card, the host interface connector may be the edge connectors of the expansion card for interfacing with the computer (i.e. the host). The data card connectors can be all other connectors and interfaces disposed on the data card to which cabling with the appropriate plugs may be used to connect to the data card connectors.

Figure 8:
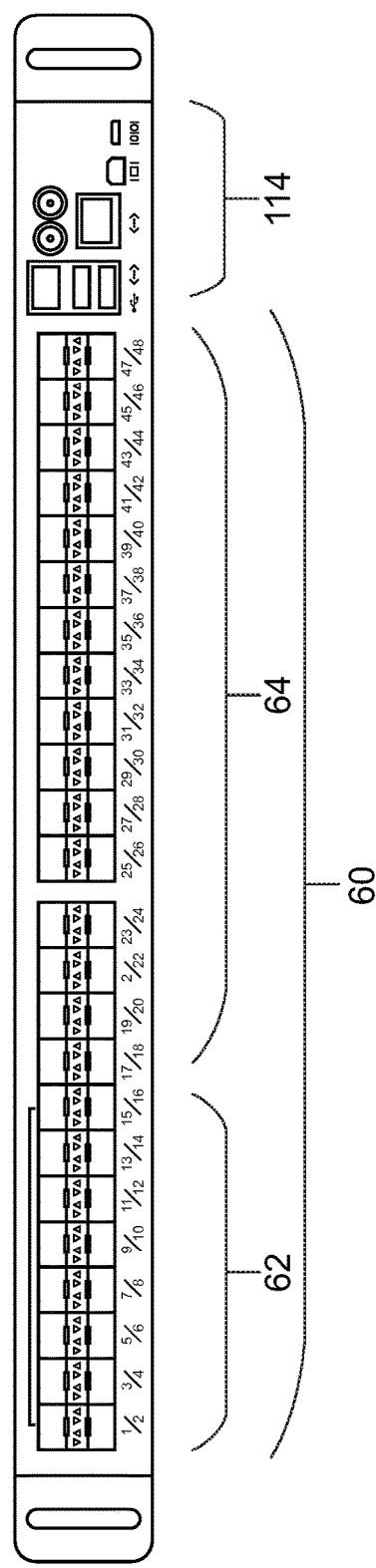
FIG. 8 is a front view of a circuit board enclosure front panel according to an aspect of the present invention.

The data card enclosure 10 also comprises external communications ports 60. The ports may be disposed on an external panel for ease of access. For example, as shown in FIG. 8, the external communication interfaces 60 may be provided on the front panel of the enclosure. The plurality of external communication ports 60 can be accessible by a user of the data card 20 to access resources (physical or electronic) on the data card without accessing the interior space of the data card enclosure and the data card 20 housed therein.

The External communication ports 60 may provide a user with easier access to the connections available on a data card 20. Particularly, when the data card is hosted on the back of a rackable server, access to the ports of the data card may be restricted. For example, access to the host interface connectors (e.g. the edge connectors of the data card) may be restricted. Externally accessible ports such as the external communication ports 60 may be linked to the data card connectors and data card host connectors to provide access to internally available links. For instance, if the data card is a PCIe-compliant FPGA card, the PCIe links provided on the edge connectors, which otherwise might not be available for use, can be made accessible and thus usable by a user of the data card.

For the purposes of this disclosure the term "accessible" can be understood to mean physical access, such as having an electrical connection between an outside device or user to a resource on the data card such as a data card connector. Access may also mean having access to the resources provided on the data card, which includes the ability to read/write data stored on the memory that may be provided on the data card or to interact with computational resources such as a processor or programmable logic available on the data card.

The data card enclosure 10 can further comprise a plurality of electrical connections 70, such as signaling traces on a printed circuit board, for connecting the data card connections 40 and the host interface connections 50 to the external communications ports 60.

The electrical connections 70 can comprise a first kind of electrical coupling 80 and a second kind of electrical coupling 90. In the present embodiment, the first kind of electrical coupling 80 can be provided to couple the data card connections 40 to the external communications ports 60. The second kind of electrical coupling 90 can be provided to couple the host interface connections 50 to the external communications ports 60.

Figure 2:
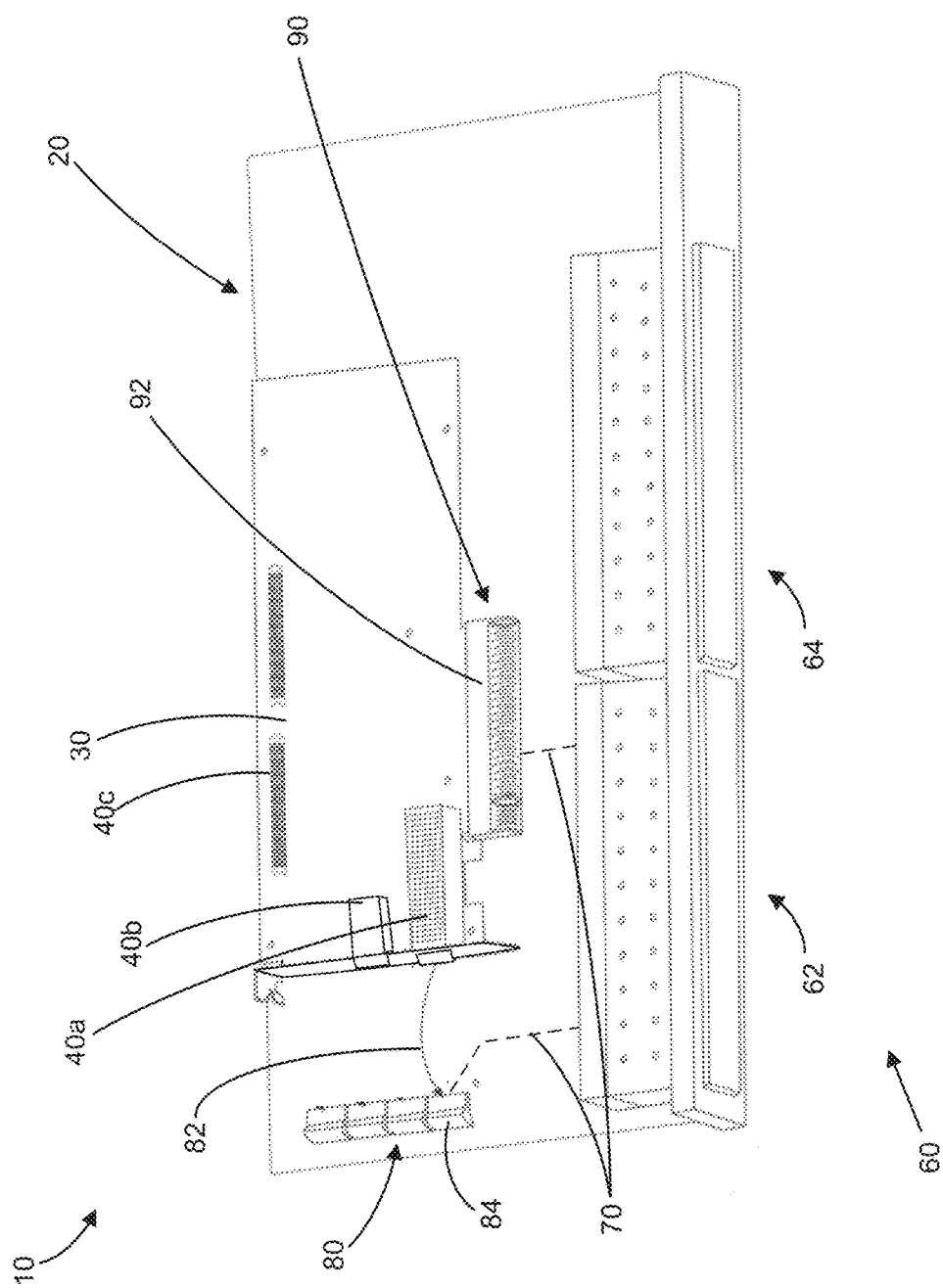
FIG. 2 is a perspective view of a circuit board enclosure of FIG. 1A hosting a differently configured data card according to an aspect of the present invention.

The first kind of electrical coupling 80 can include cabling 82 for connecting data card connectors 40 to terminating connections 84. As depicted in FIG. 1A and FIG. 2, the data card of FIG. 1A includes a number of QSFP high-speed serial interfaces 40 while the data card of FIG. 2 has a single QSFP interface 40a. For connecting to these interfaces, cables 82 may be provided to connect each interface 40 and 40a of FIG. 1a and FIG. 2, respectively, to a corresponding electronic terminating connection 84 on the enclosure. As shown in FIG. 1A, four data cables can be used to connect the four QSFP interfaces 40 to the enclosure. In FIG. 2, a single data cable is used to connect the single QSFP interface 40a to the enclosure.

Figure 3B:
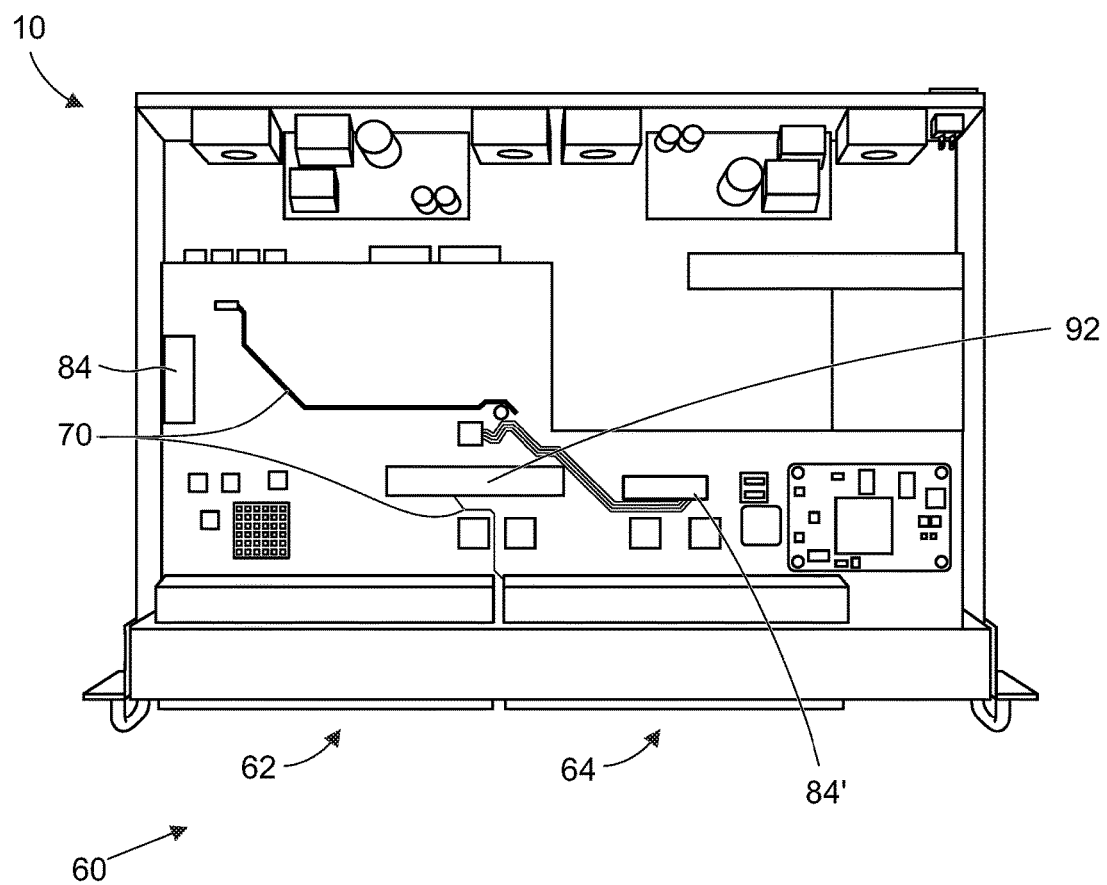
FIG. 3B is a top view of a photo of a circuit board enclosure with horizontal and vertical connectors according to an aspect of the present invention.
Figure 4:
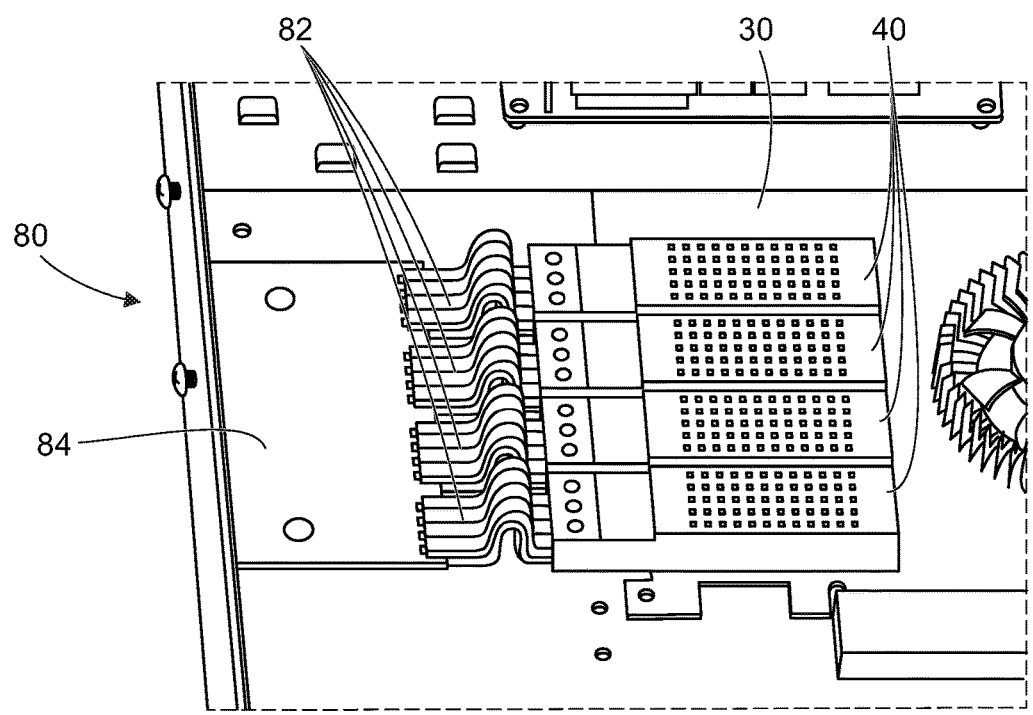
FIG. 4 is a perspective view of a section of a data cable and connector for the circuit board enclosure of FIG. 3 according to an aspect of the present invention.

In some other embodiments the cabling 82 may connect unequal numbers of terminating connections and data card connections. An example is depicted in FIG. 4, in which cabling 82 connects four data card connections 40 (e.g. QSFP interfaces) with a single terminating connection 84. FIG. 3 shows the single terminating connection 84 having electrical contacts for receiving electrical connections from multiple cables.

In yet other embodiments cabling 82 may include other types of cabling including custom cabling for connecting to various types of interfaces on the data card. The first kind of electrical coupling 80 may comprise couplers to couple to at least one of a multiline transceiver interface, such as Quad Small Form-factor Pluggable interface, as noted above, small form-factor pluggable interface (SFP), and proprietary user interface, among others.

The first kind of electrical coupling 80 may be connectors that are releasably attachable to the plurality of data card connectors 40. For example as depicted in the embodiment of FIG. 2, a data card 20 may comprise multiple types of interfaces for providing data card connections. As shown in FIG. 2, data card 20 comprises small form factor (SFP) connections 40a, Universal Serial Bus (USB) connectors 40b, and FPGA Mezzanine Card (FMC) connectors 40c. In each case, the data card connections may be connected to the external communications ports 60 by means of the electrical connections 70 using the first kind of electronic couplings 80. Specifically, the first kind of electronic couplings 80 comprise electrical cables 82 and terminating connectors 84, and an appropriate coupler to mate with the appropriate data card connector 40a, 40b and 40c (e.g. SFP, USB, FMC, etc.) provided on the data card to connect the data card connectors 40a, 40b, and 40c to traces on the motherboard 32, which are provided to link the data card connections to the external communications ports 60.

In the embodiment depicted in FIG. 2, the enclosure 10 comprises a single terminating connector 84 connected to a single SFP connection 40a by a single cable 82. However, In FIG. 3A the enclosure 10 comprises a single terminating connection 84 provided to connect by means of cabling to multiple card connections 40 (in the present case, two connectors). As mentioned above, in other embodiments other ratios of data card connectors to terminating connectors may be used with various cabling configurations. In FIG. 3B, the enclosure (without data card installed) 10 comprises two terminating connections, a vertically oriented terminating connection 84 and a horizontally oriented terminating connection 84'. In this configuration, the vertical terminating connection 84 may be connected to a first set of external communication ports 62 and the horizontal terminating connection 84' may be connected to the second set of external communication ports 64.

Figure 5:
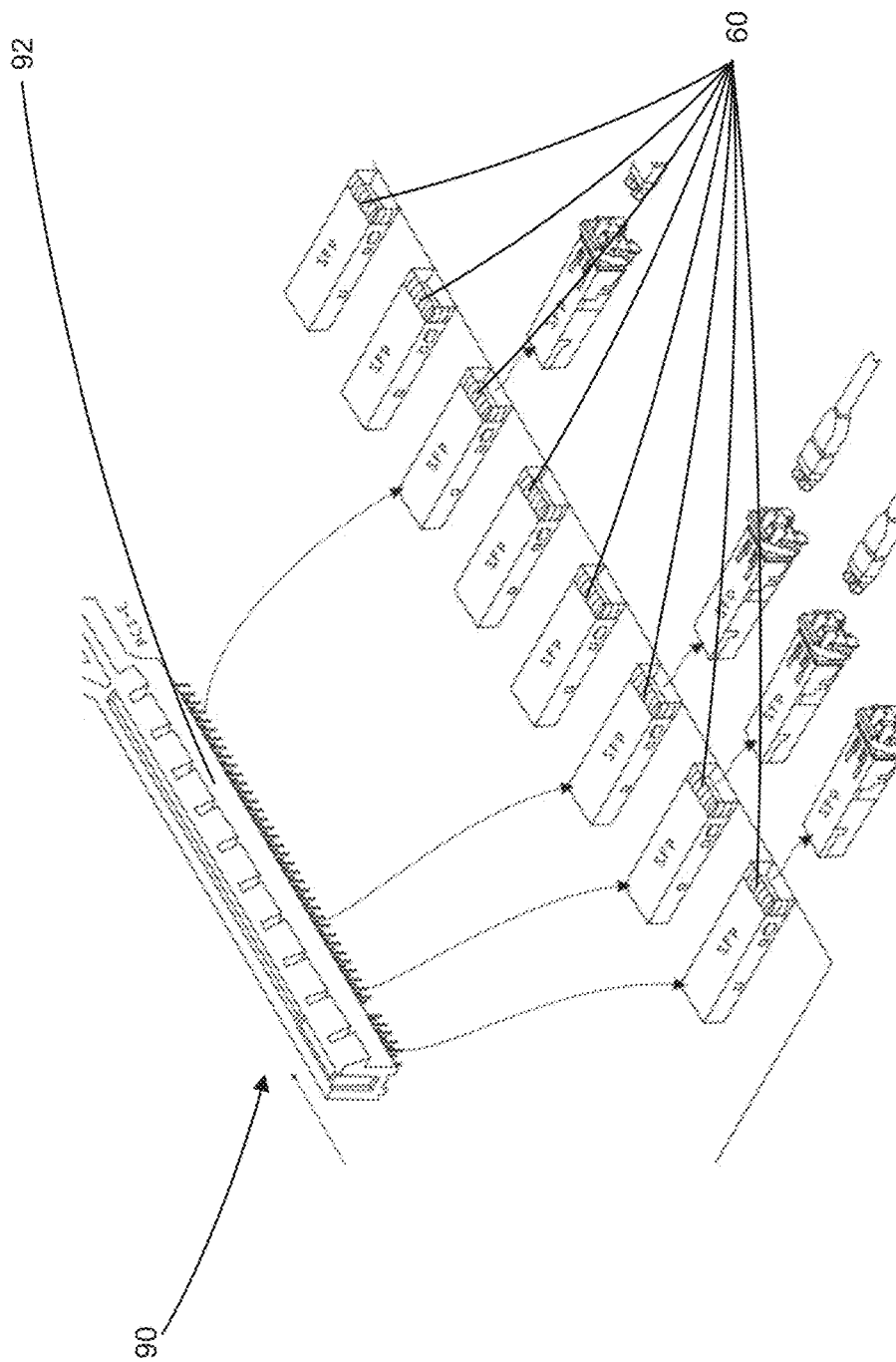
FIG. 5 is a perspective schematic view a section of a circuit board enclosure according to an aspect of the present invention.

As depicted in FIG. 5, the enclosure card receptacle 92 defines electronic coupling of the second kind 90, which may be connected to the external connection ports 60 by any means which provides electrical connections.

Figure 1B:
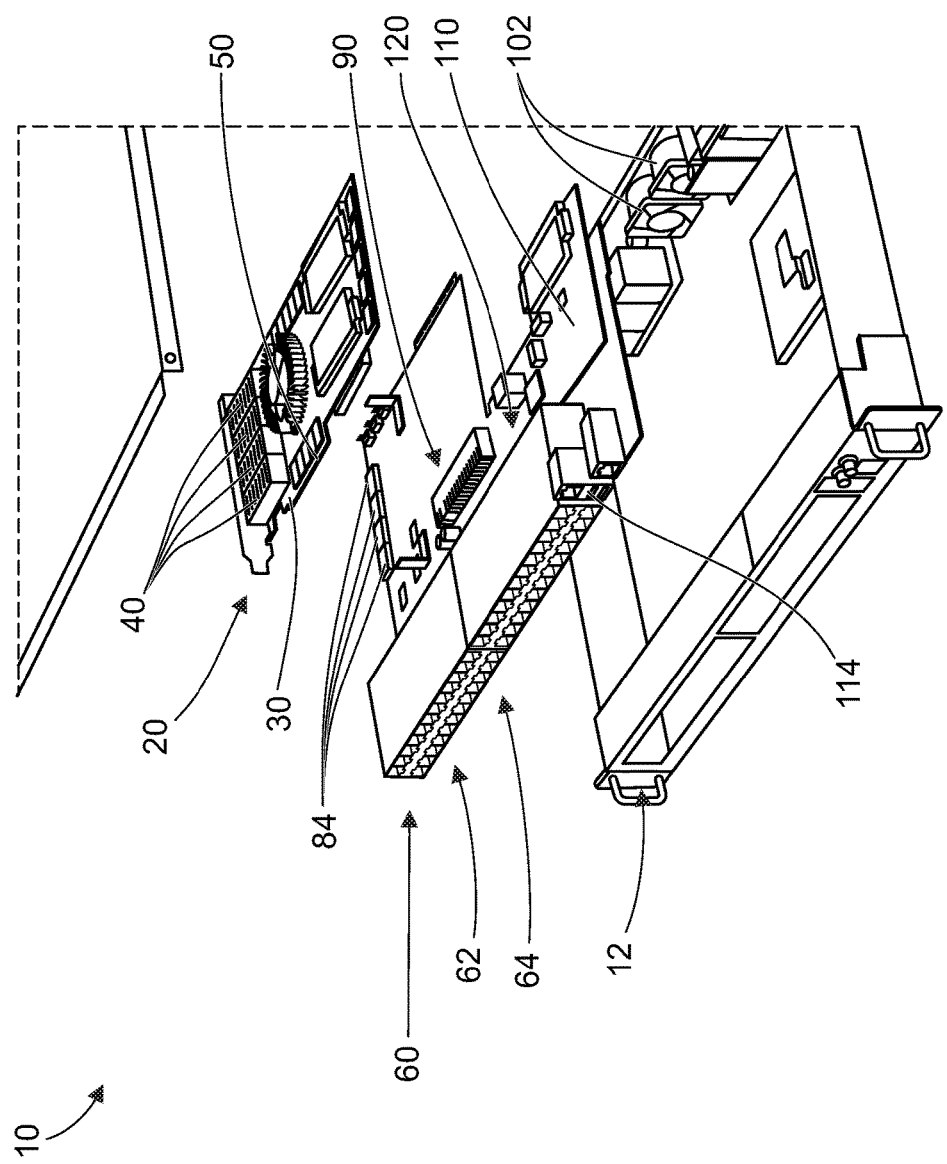
FIG. 1B is an exploded view of the circuit board enclosure of FIG. 1A according to an aspect of the present invention.

Terminating connectors 84 may be provided to couple the cabling 82 to the motherboard 32 of the data card enclosure. As depicted in FIGS. 1A and 1B, the motherboard 32 may comprise traces for providing electrical connections 70, which are provided to connect the terminating connections 84 to the external communications ports 60.

Figure 6:
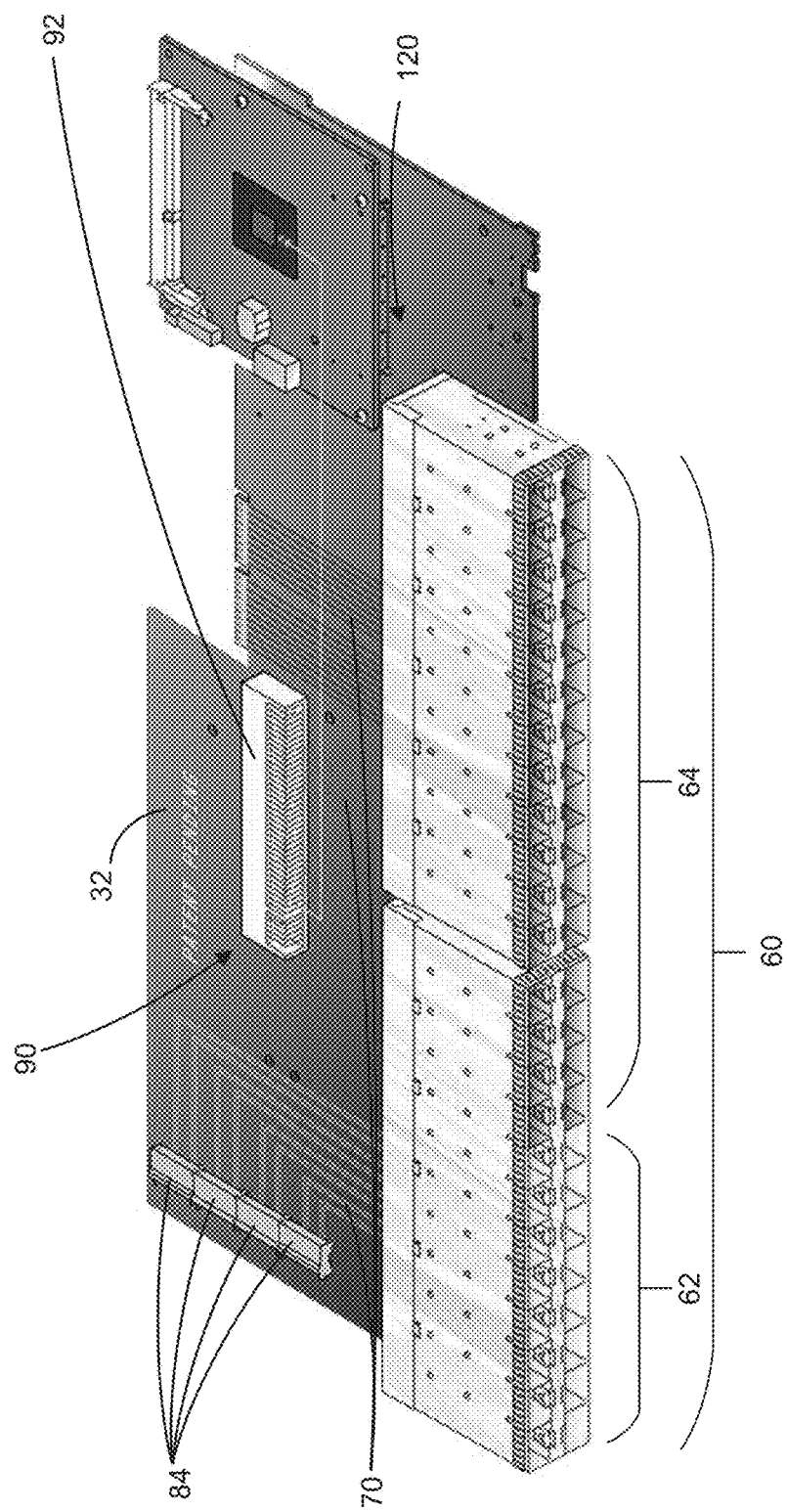
FIG. 6 is a perspective schematic view a section of a circuit board enclosure of FIG. 1A according to an aspect of the present invention.
Figure 7:
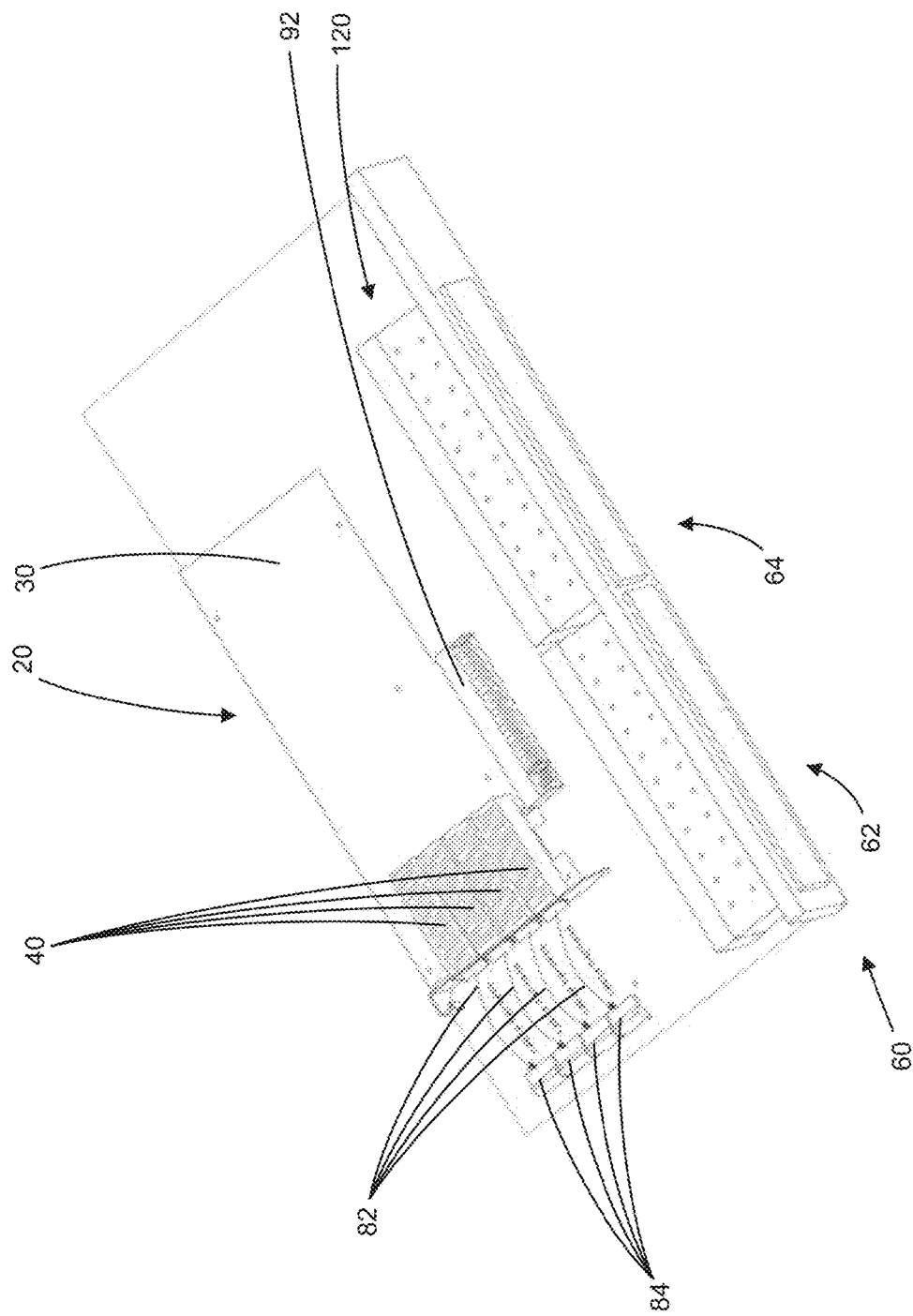
FIG. 7 is a perspective view a section of a circuit board enclosure of FIG. 1A according to an aspect of the present invention.

The second kind of electrical coupling 90 can be used to connect to the host interface connections. In the present example, the second kind of electrical coupling 90 may be an enclosure card receptacle 92. The enclosure card receptacle 92 can be provided to couple the host interface connections 50 to traces on the motherboard 32, such as the electrical connections 70. The traces on the motherboard 32 are provided to connect the second kind of electronic coupling 90 to the external communications ports 60, so that the host interface connections may be accessible using the external communication ports 60. In contrast, if the same data card being hosted by the enclosure was hosted, instead, by a computer or a rack server, the host interface connectors would generally be externally inaccessible (e.g. inaccessible to a device other than a server or computer). FIG. 6 provides a more detailed depiction of traces, such as the electrical connections 70, provided on motherboard 32.

The second kind of electrical coupling 90 may comprise Peripheral Component Interconnect Express interfaces to permit the data card to communicate with a data card host, such as the enclosure.

The host interface connectors 50 can comprise electrical contacts that project from a surface of an edge of the printed circuit board 30 to define data card edge connectors with a plurality of electronic contact surfaces (not shown) and a plurality of connector positioning surfaces (not shown), the latter being usable for aligning the data card to the appropriate connector. The second kind of electrical couplings 90 include the enclosure card receptacle 92 comprise a plurality of complementary electronic contact surfaces (not shown) for contacting the plurality of electronic contact surfaces of the plurality of host interface connectors 50 when the host interface connectors 50 are received into the card receptacle 92. The data card enclosure housing 12 further includes a plurality of enclosure positioning surfaces (not shown) for contacting the plurality of connector positioning surfaces to align or position the plurality of host interface connectors 50 relative to the enclosure housing 12 such that the plurality of electronic contact surfaces of the plurality of host interface connectors 50 contact the matching electronic contact surfaces of the data card receptacle (i.e. the second kind of electronic couplings 90).

In some embodiments the receptacle 92 belonging to the second kind of electronic couplings 90 establishes a Peripheral Component Interconnect (PCI) Express compliant interface for receiving a PCIe compliant data card.

In some embodiments, the data card enclosure 10 further comprises a signal conditioning system. The signal conditioning system can be electrically coupled to the plurality of external communication ports for maintaining compliance of electrical signals within the plurality of electrical connections to a signaling standard. The signaling standard may specify at least the threshold signal amplitude and a signal to noise ratio that the signal conditioning system may be required to maintain.

The external communications ports 60 may be subdivided to comprise a first set of external communication ports 62 and a second set of external communication ports 64. For example, in some implementations, one subset may be able to operate at higher bit-rates. For example, the first set of external communication ports 62 may be designated for connecting to QSFP interfaces or other high-speed serial data links that operate at up to 25.78 Gbps "25G" Ethernet. The second set of external communication ports 64 may be able to operate at a maximum rate that is lower than the first set. For example the second set of external communication ports 64 may have a maximum bit-rate of 10 Gbps. In other words, the first set of external communication ports 62 may be operable to communicate at a first maximum bit-rate that is greater than a second maximum bit-rate of the second set of external communication ports 64. In certain embodiments the first set of communication ports 62 may be connected to a particular subset of the data card connectors 40, defined by a particular type of data card connector, such as QSFP connectors on a data card, if such connectors are available. In some other embodiments, all of the external communication ports 64 may operate at the same maximum bitrate. In yet other embodiments, the second set of external communication ports 64 may have a higher maximum bitrate compared to the first set of external communication ports 62.

In some embodiments the data card enclosure may further comprise a host data processor coupled to the plurality of external communication ports 60 and operable to monitor, for each external communication port in the plurality of external communication ports 60, a status of that external communication port, the status indicating at least i) a bit-rate of that external communication port; ii) at least one connector in the plurality of data card connectors and plurality of host interface connectors to which that external communication port is connected; and iii) a type of an external connector coupled to that external communication port.

In some embodiments, a host data processor can be provided on the main motherboard 32. In such embodiments, this host data processor may be computer-on-module (COM) Express Module, such as COM Express Module 110. In some embodiments the host data processor is a command line interface built into the enclosure, which may be accessed directly or through COM Express Module 110, which may together form the host data processor.

In other embodiments other host data processor components may be used. For example, an embedded controller may be provided, built into the enclosure motherboard. The embedded controller may operate as host data processor and may provide a user interface, such as a command line interface. In this embodiment, the COM Express Module may be an optional component. In other embodiments, the enclosure may be delivered to a user without the COM Express Module, or a COM Express Module may be delivered without a pre-installed Operating System (OS). The optional COM Express Module may operate in conjunction with the embedded controller to provide additional functionality for the enclosure. In one instance, a user may use the enclosure as a computer, by exploiting the availability of the COM Express Module. In other cases, if the data card has a FPGA or other programmable logic device or devices installed thereon, the COM Express Module may be a convenient way to perform device programming (e.g. FPGA development and configuration) and device trouble shooting, if the appropriate development tools are installed. Alternatively, depending on the configuration and availability of resources on the FPGA card, the FPGA can be accessed, for example, reconfigured via the host interface connectors such as the PCIe ports. In other embodiments, FPGA configuration can be accomplished via the enclosure remotely via network access (e.g. Ethernet) or through special management ports such as out-of-band ports also provided on the enclosure operable for administering the enclosure, the data card or both. The host data processor may be operable to provide a user interface for representing the plurality of external communication ports and for indicating, for each external communication port, the status of that external communication port to the user of the data card 20.

Reference is now made to FIGS. 10 to 14, which depict various interfaces and functions 150, 152, 154, 156, and 158 which may be available to a user of the data card enclosure. A user may be able to enter a number of device monitoring commands and other commands to obtain information or send instructions.

Figure 10:
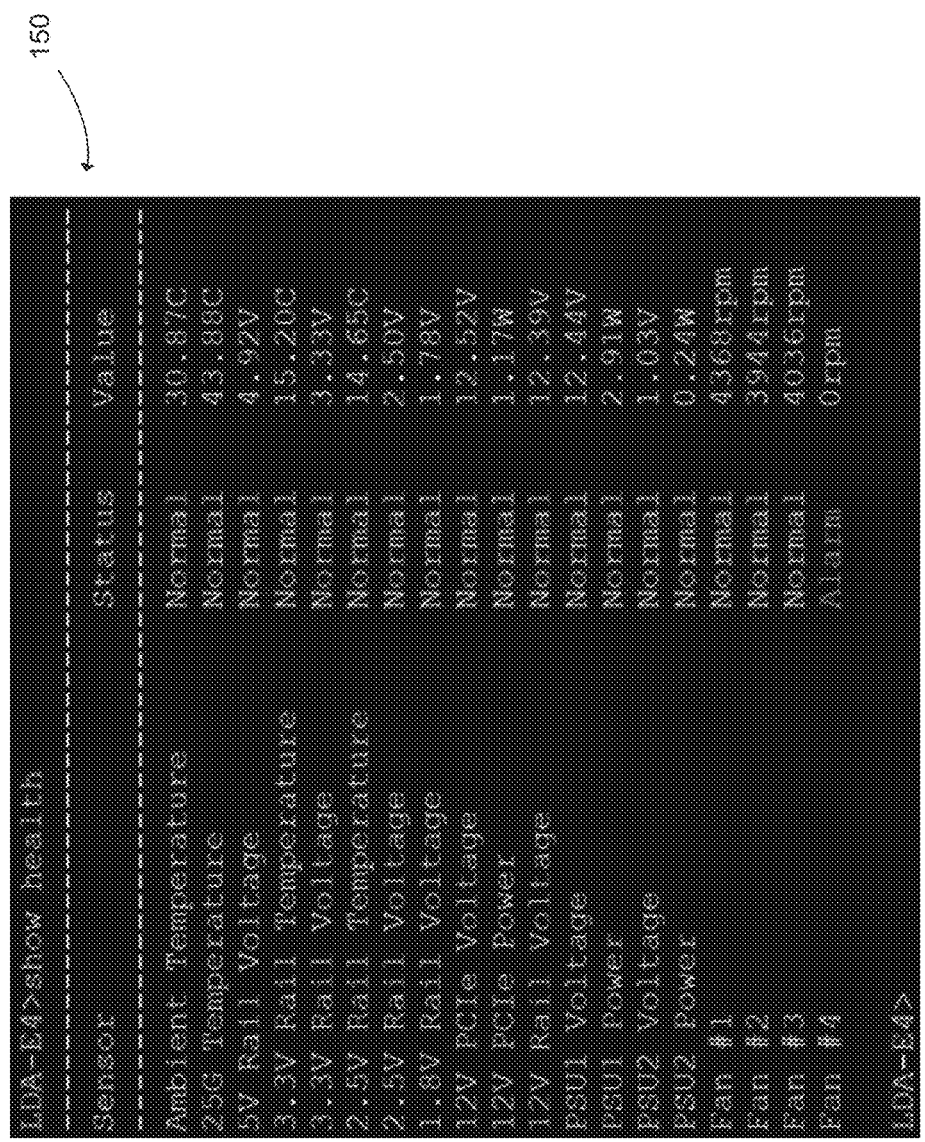
FIG. 10 is a depiction of a portion of a user interface according to an aspect of the present invention.

For example, FIG. 10 depicts an inquiry for current information from all device sensors such as voltage and power on vital rails, temperature on the key device parts, fan status, etc. As depicted in FIG. 10, the command "show health" can result in information indicating an alarm or alert if one or more of the monitored parameters is outside a defined acceptable operating range. As shown in FIG. 10, an alert is generated as a result of one of the fans being non-operational (e.g. spinning at 0 revolutions per minute (RPM)), and that all other sensors are indicating normal function.

Figure 11:
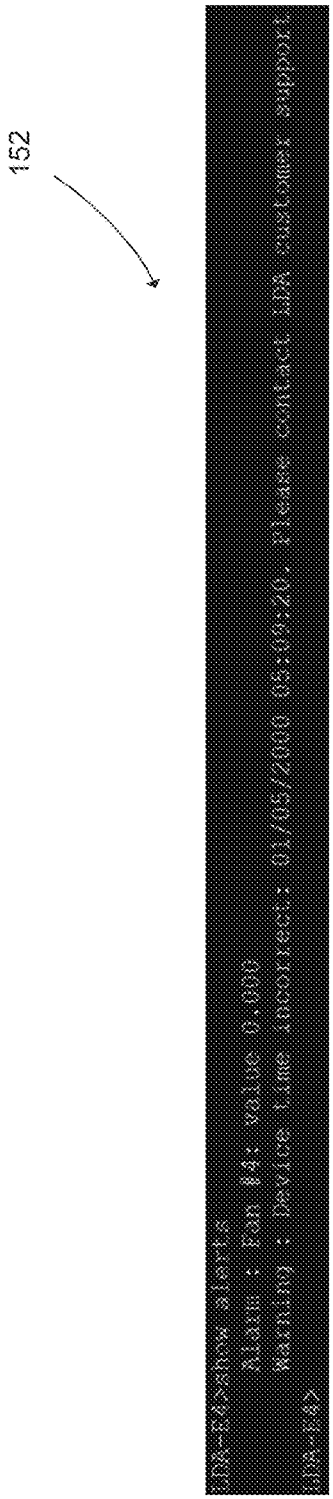
FIG. 11 is a depiction of a portion of a user interface according to an aspect of the present invention.

FIG. 11 depicts another inquiry made by a user, specifically for displaying system-level alerts. The command "show alerts" can be used to show a list of active alerts, and each alert can be provided with corresponding information. In the example shown, the active alerts indicate a disconnected fan and a disconnected internal timer battery.

Figure 12:
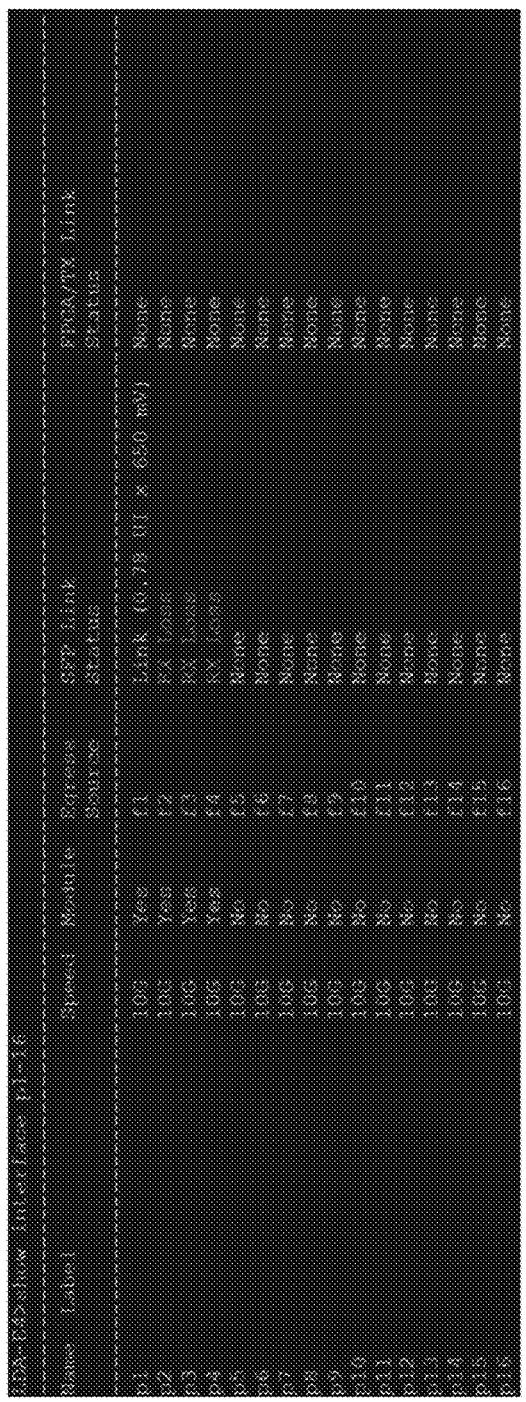
FIG. 12 is a depiction of a portion of a user interface according to an aspect of the present invention.

The user interface may also permit a user to obtain information about specific devices or components of the data card enclosure. For example, FIG. 12 depicts an inquiry as a result of a user entering the command "show interface p1-16" to obtain information concerning the status of external communication ports 1 to 16. The information presented in the interface is a listing of the external communication ports in question as indicated in the column "Name". The entry for port 1 is indicating that port 1 has an active link from the SFP side (i.e. an SFP transceiver is connected to port 1) as shown in the column entitled "SFP Link Status", with information concerning the quality of the signal's corresponding eye diagram reported (e.g. unit interval 0.78). SFP Link Statuses for entries corresponding to ports 2 through 4 indicate SFP modules being inserted, but an optical link is not established by indicating an RX Loss (Receive Loss) state. The remaining ports listed do not have SFP modules inserted as indicated in the "SFP Link Status".

Lastly, in the present example, a data card, specifically an FPGA data card is not installed. As such, the column entitled "FPGA/TX Link Status" indicates an absence of a link (e.g. "None"). Where an FPGA or data card is installed, the destination port and link status can be indicated.

Figure 14:
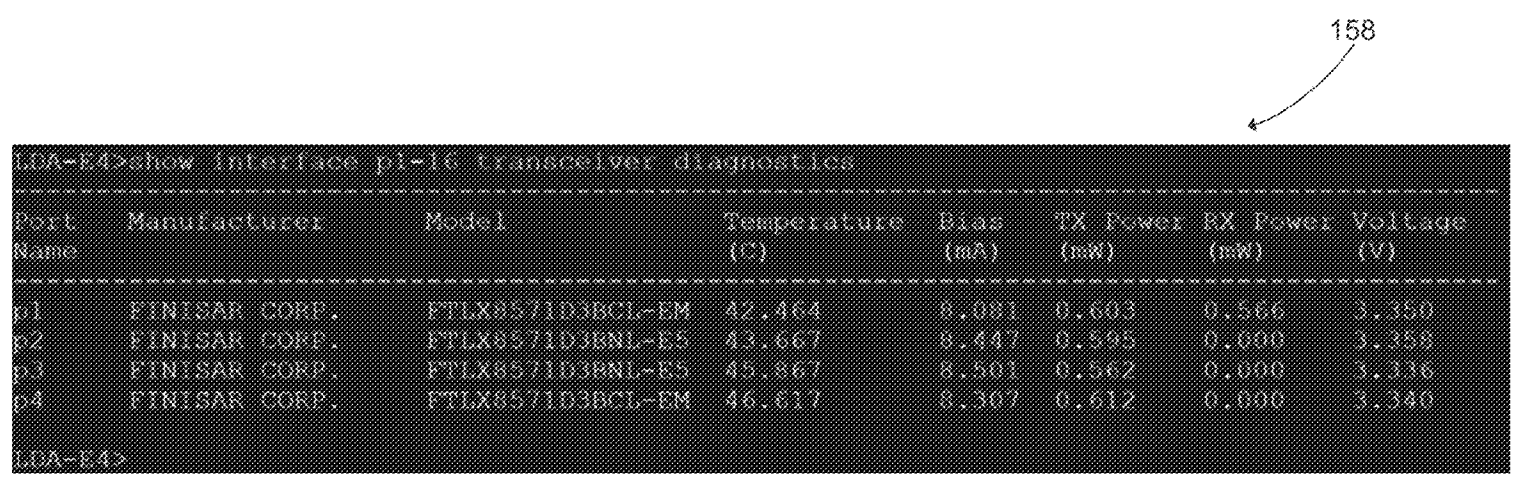

Many other specific inquires may also be made. For example, FIGS. 13 and 14 depict inquiries concerning transceiver information for ports 1 to 16. As depicted, information for ports 1 to 4 is returned, as ports 5 to 16 do not have transceivers inserted. The type, quantity, quality, and detail of information returned may be customized as required.

Commands may also be used to control various variables of the data card enclosure. For example, commands may be used to set the speed of selected ports, assign a source for outgoing signal of a selected port, power down or restart components of the data card enclosure, adjust the clock frequency for various components, etc.

In some embodiments, if the data card is a PCI Express-compliant FPGA card, the user interface may permit a user to send a command to the host data processor to trigger a power cycle to reset the data card. The data card may obtain operating power from a number of sources. For example, power may be provided through the PCI Express interface of the PCI Express-compliant card. The data card may alternatively have a power connector on the PCB for receiving power. In some other cases, the data card may be configured to accept power from both the PCI Express interface and an on-board power connector. For example, a command called "PCIe power-cycle" may be provided, and may power off the PCIe device connected to the enclosure (through which the data card may obtain power) for a short time (e.g. 3 seconds or another duration specified by the user) and then power it back on. The enclosure may detect how the power is being provided to the data card (e.g. via PCI Express, separate connectors or both) and control the power supply accordingly based on the manner in which power is provided to the data card. From a processor standpoint (i.e. the FPGA) this could be the same as a cold reboot even though the enclosure itself is not rebooted. This embodiment may allow reloading of FPGA firmware without rebooting the entire enclosure. Other commands may be available for PCIe management, including a command to toggle a RESET signal used in the PCIe standard. This command may be useful to reset Intellectual Property (IP) cores loaded into the FPGA without having to power off the data card receptacle (e.g. PCIe interface). Furthermore, other commands may be provided to set PCIe clock frequencies and specify the duration of reboots. These PCIe management commands may provide control over the data card independent of the enclosure as a whole or the system or network in which an enclosure is connected, in particular the power-cycle may be able to power down and/or reboot the PCIe Express compliant card independent of the device hosting the card. Rebooting or resetting the data card in this manner would generally not be possible if the card is hosted in a typical computer system such as a rack mounted computer, since power cycling the data card would also require power cycling the host computer.

The data card enclosure may further comprise a host data processor interface connector(s) 114 as shown in FIG. 8 provided on the exterior of the enclosure for the user of the data card 20 to communicate with the host data processor. However, in some embodiments, these connectors may be excluded or comprise different types of connectors. Such modifications may provide flexibility to the design of the enclosure.

In some embodiments the data card enclosure comprises external USB or display port interface and other ports to permit a user to attach interface apparatus such as a mouse, keyboard, or monitor, to use the enclosure alone. Such a configuration may be provided to enable ease of development and troubleshooting in various circumstances. For example, a user may use the interface to perform development and/or trouble shooting at the card-level (separate from the enclosure) or enclosure-level (separate from the data card) or both.

The data card enclosure may further comprise an air circulation system having at least one fan 102 to circulate air through the interior space of the enclosure 10. The air circulation system may have a temperature sensor (not shown) to measure a temperature value within the interior space occupied by the data card 20, each fan 102 being controllable by the host data processor to adjust a rotational speed of a set of fan blades of that fan based on the temperature value measured by the at least one temperature sensor and provided to the host data processor.

In some embodiments, the air circulation system may comprise a plurality of sensors distributed throughout at least the interior of the data card enclosure. Sensors may be distributed to monitor groups of external ports; alternatively a sensor may monitor each individual port. Sensors may also monitor other components of the data card enclosure, as indicated above.

In some embodiments the data card enclosure further comprises a switch fabric 120 coupled to the external communication ports 60 and the data card connectors 40 and host interface connectors 50. The switch fabric 120 is configurable by the host data processor 110 to map at least one connector in the plurality of data card connectors 40 and host interface connectors 50 to at least one external communication port by establishing an electronic communication pathway from the at least one connector in the plurality of data card connectors 40 and host interface connectors 50 to at least one external communication port using the plurality of electrical connections 70.

Figure 15:
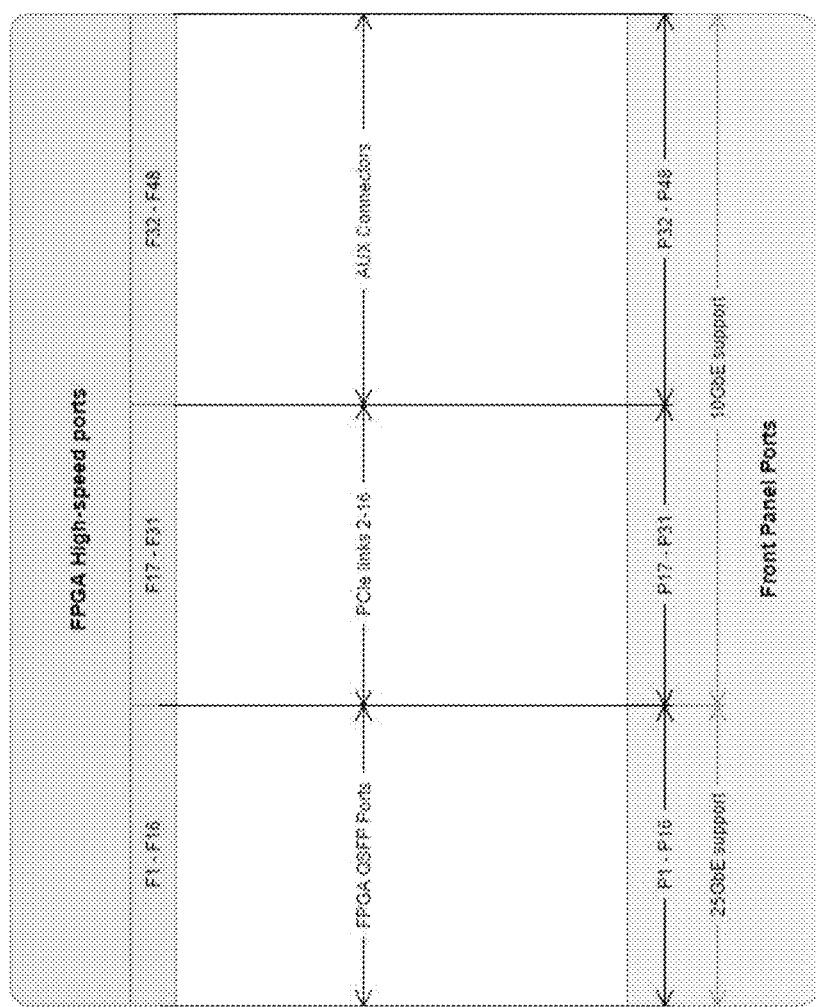
FIG. 15 is a schematic view of a port mapping architecture according to an aspect of the present invention.

As depicted in FIG. 15, in some embodiments various ports on a data card, such as QSFP ports, PCIe links and other auxiliary connectors such as USB, SATA, and SAS connectors, may be mapped to external communications ports on the front panel of a data card enclosure. As an example, in some default configurations each port of the data card may be given a designation, such as F1 to F48, while each external communication port may be given a designation, such as P1 to P48, and each F port may be routed to its counterparty P port with the same number, while data sent in the opposite direction will also conform to the same routing.

As depicted in FIG. 8, the front of a data card enclosure may comprise a plurality of ports, which may include external communications ports 60, and various alternative ports 114. As mentioned above, the alternative ports may be provided to facilitate a variety of interface and interaction functions between a user and the data card or other components of the data card enclosure.

In some embodiments custom cabling may be used to connect data card connections or host interface connections to traces on a motherboard or other electrical connections to the external communications ports. Custom cable may include various terminals to mate with various data card connectors.

Embodiments of the present invention using an enclosure may provide access to host interface connectors, which may not have previously been accessible via external communication ports. This may enable the connections to be repurposed. It may particularly enable the host interface connections to be repurposed and used as high-speed links for networking applications, for exchanging data between an external device and the data card. For example, links on the data card such as the PCIe, SATA or USB Type-C can be repurposed to be usable in networking applications. In particular, if the data card is a PCIe card with 1, 4, 8 or 16 PCIe lanes, then any number of additional data links may be made available from one to at least the number of PCIe lanes available on the data card.

For example, if the data card is a PCIe-compliant FPGA card, the PCIe connections that make up the edge connectors, which are normally used for configuring the FPGA, are now accessible and may be repurposed to be usable as additional communication links. Specifically, the PCIe connections can be used to increase the number of data card connections to increase the amount of data transferred between an external device and the FPGA. For example, the PCIe connections may be repurposed and may be used as Ethernet links so that the FPGA and external device (i.e. a network-accessible device) can communicate using an established networking communication protocol. Having additional data links may be beneficial in high-bandwidth applications such as network communications. As such, the term "repurpose" as used in the present context of the present disclosure may include using data links previously used for communication according to one protocol (e.g. PCIe for configuring an FPGA) as data links operable/compliant with another protocol (e.g. Ethernet).

In other embodiments of the present invention, a data card extender may be used in connection with, or instead of, an enclosure. The data card extender may be used in conjunction with a low-profile data card so that the combined data card and data card extender combination correspond to a full-size data card.

Figure 9:
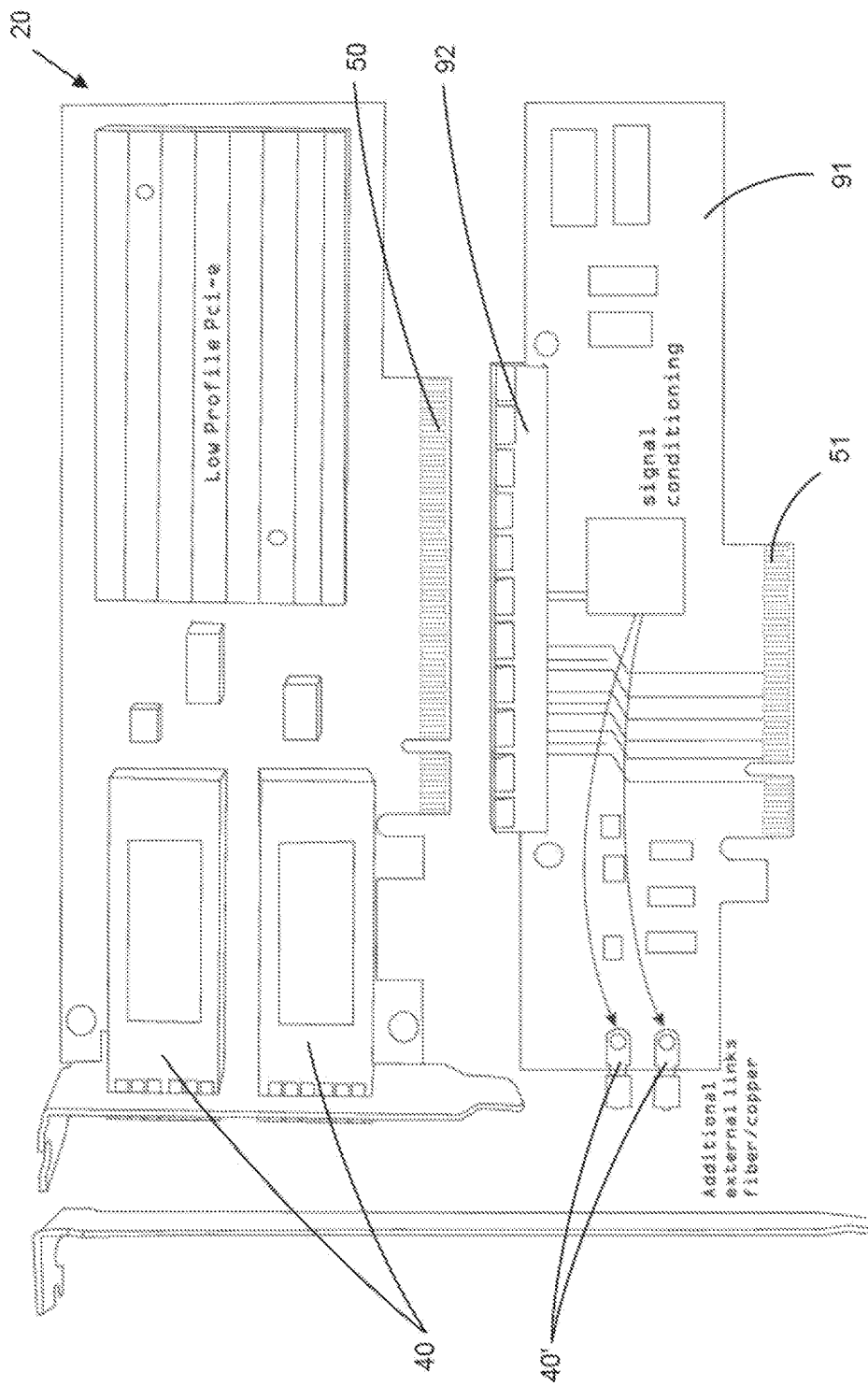
FIG. 9 is a flow chart of a method of using a data card enclosure according to an aspect of the present invention.

As depicted in FIG. 9, in some embodiments comprising a data card extender 91, the data card extender 91 may comprise a receptacle connector 92 for interfacing with host interface connectors 50 on the data card 20. The receptacle connector 92 may be provided on a first edge of the data card extender 91. The data card extender 91 may further comprise one or more data card extender ports 40' on a second edge of the data card extender 91. The second edge may be oriented at least 80 degrees relative to the first edge, such that when the first edge is adjacent an edge of the data card, and both the data card extender 91 and the data card are inserted into the computer housing, the second edge can be externally accessible via the opening of the computer housing into which the data card and the data card extender 91 were inserted. In many embodiments, the angle of the first edge to the second edge would be approximately 90°, but other angles are also possible provided the second edge remains externally accessible when the data card extender 91 is within the computer housing. The data card extender 91 may comprise connector card host data connectors 51, and may be used to repurpose data card host interface connectors 50 into additional data links, as described in more detail below.

An enclosure or data card extender may repurpose any number of data card host interface connectors 50 into data card connectors 40. For example, in some embodiments the data card may be a PCIe X16 FPGA board, and may therefor comprise 16 PCIe links. Such a data card may be connected to a X16In/X1Out data card extender, in which the X1Out corresponds to the number of "outgoing" PCIe links being routed to the host interface connectors of the data card extender 91 and not usable for repurposing. In this configuration, the remaining 15 PCIe links from the extender card may be repurposed or converted into data card connections, see ports labeled "Additional external links fiber/copper" in FIG. 9. Data card extenders may also be X16In/X4Out (up to 12 additional links gained), X4In/X1Out (up to 3 additional links gained), or any other available data card extender, and may enable various numbers of host interface connectors to be converted into data card connectors. Table 1 tabulates possible In/Out combinations that may be achieved using different low-profile PCIe board configurations in conjunction with a given extender card.

TABLE 1

In/Out combinations

| PCIe low-profile board (Incoming PCIe links) | Outgoing PCIe links | Maximum number of additional links gained |
|---|---|---|
| X4, X8, X16 | X1 | 3, 7, 15 |
| X8, X16 | X4 | 4, 12 |
| X16 | X8 | 8 |

As noted above, repurposing a connector may involve converting the signalling standard utilized in connection with the connector, wherein a signalling standard comprises a number of signalling standard parameters, such as signal amplitude and signal reference clock frequency.

In some embodiments, to repurpose a connector operating according to one signalling standard to a new signalling standard, the frequency of the signal may be changed by changing the reference clock to correspond to the signalling clock for the new signalling standard.

However, it may not always be necessary to change the reference clock to change one signalling standard to a new signaling standard. For example, where both the current and new signalling standards operate at the same frequency, the reference clock may not need to be altered. However, other parameters of the signal may need to be altered, such as the amplitude, to meet the signalling requirements of the new signalling protocol.

In some embodiments, each data card connector, including all SATA connectors, SAS connectors, USB connectors, etc., may operate according to an assigned signalling standard for sending and receiving data, which may include its own reference clock. In some embodiments, the signalling standard parameters associated with the data card connectors may be defined by components internal to the data card.

In some embodiments, each host interface connector, such as each PCIe connector, may operate according to an assigned signalling standard for sending and receiving data, which may include its own reference clock.

In some embodiments the data card connector signalling standard may be different from the host interface signalling standard, such that to repurpose a connector from one to the other requires converting the signals passed through a signal line in the connector from one signalling standard to the other.

Figure 16:
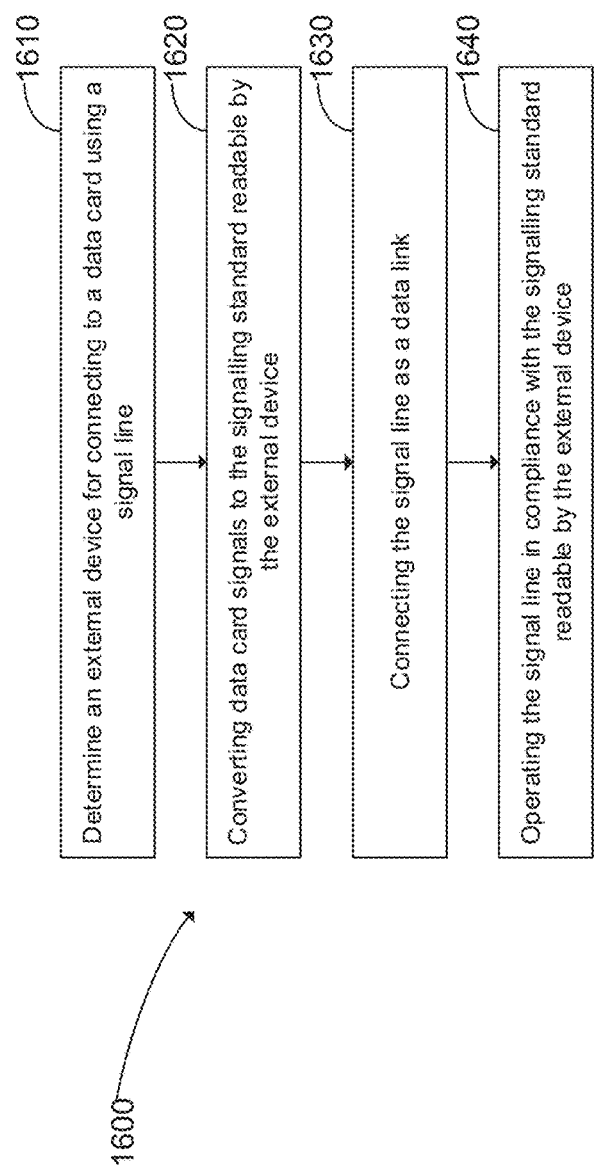
FIG. 16 is a schematic view of a port mapping architecture according to an aspect of the present invention.

In some embodiments 1600, depicted in FIG. 16, a data card may comprise a signal line that may be repurposed, such as a signal line of the host interface connector or data card connectors described above, which couple to data card attachments such as the data card receptacle 92 or the electrical coupling 80 as described above. The signal line may be configured to carry data card signals provided by the data card, wherein the data card signals may be compatible with at least a first signalling standard, such as a PCIe, USB or other signalling standard. For an FPGA-based data card, such signals may be generated by the FPGA, for example by programming the FPGA with appropriate components such as FPGA Intellectual Property (IP) Cores specifically for using a PCIe PHY or Ethernet PHY. Accordingly, multiple IP Cores may be installed so that the FPGA may be operable to output signals corresponding to various signaling standards along the same signal line when a proper reference clock for those signaling standards is provided. In other embodiments, the FPGA may require additional IP Cores to implement communication in a different protocol and to provide signal conversion for other portions of the FPGA for processing.

While the data card's signal line may operate according to a first signaling standard, the external device may be identified and be provided at 1610 for connecting to the data card using the signal line. For example, the connection may be established using either the enclosure 10 or data card extender 90 described above. The external device may be configured to provide device signals compliant with a second signalling standard, such as Ethernet signalling standard. As such, data card signals compatible with the first signalling standard may not be readable by the external device and device signals compliant with the second signalling standard may not be readable by the data card when received via the signal line. The data card signals may then be converted 1620 to new data card signals compliant with the second signalling standard and readable by the external device. The signal line may then be operated as a data link 1630 between the data card and the external device and may be operated 1640 in compliance with the second signalling standard to carry the new data card signals such that the new data card signals communicated to the external device are compliant with the second signalling standard and are readable by the external device.

While the steps in the method 1600 are numbered, these steps may be performed in any appropriate sequence and embodiments of the invention are not restricted to the progression provided herein.

In some embodiments the first and second signaling standards may specify first and second sets of clock frequencies, respectively within which those standards operate. The clock for the signal line in the first signaling standard may be referred to be the signal line clock. The clock for the second signaling standard may correspond to the standard used by the external device in which communication with the data card is desired. The external device may operate at a device clock frequency within the second set of frequencies. In some embodiments, the first clock frequency set may contain at least one frequency also contained in the second clock frequency set. Converting the data card signals to new data card signals compliant with the second signaling standard may be accomplished at least by determining the frequency values of the first and second set of frequencies and identifying a reference clock frequency that is common to both the first and second set of frequencies, and then providing the data card with reference clock frequency common to both standards. Further, the value of the reference clock frequency can be chosen so that i) it is common to both the first and second set of clock frequencies and ii) the reference clock frequency is closest to the frequency of the signal line clock.

In other implementations a data card may comprise a number of signal lines and a signal line may be chosen for repurposing from out of the number of signal lines. As noted above, the data card may have data card and host interface connectors accessible via the enclosure or data card extender. Each data line may be configured to operate within its own protocol (e.g. SATA, USB, SAS etc) in which each protocol may have its own set of supported clock frequency or frequencies. The signal line used for repurposing can be selected by determining a first set of clock frequencies corresponding to the supported clock frequency or frequencies of a given signal line in the set of signal lines and determining a second set of support clock frequency or frequencies supported by the signaling standard of the external device. Based on the protocol of the external device, and its corresponding set of support frequencies, a data line can be chosen whose respective clock frequency or frequencies are closest to the clock frequency of the external device. A reference clock common to both sets may be used to repurpose the signal line. Further, the value of the reference clock frequency can be chosen so that i) it is common to both the first and second set of clock frequencies and ii) the reference clock frequency is closest to the frequency of the signal line clock.

As noted above, the data card may be operable to provide signals along the signal line in both standards (e.g. an FPGA having multiple networking PHY IP cores installed). The data card can then be operated to generate new data signals compliant with the second new signaling standard based on the reference clock. In the case of the FPGA data card in which a PCIe link is repurposed as an Ethernet link, the data card can be instructed (e.g. by a user sending an input via an interface on the enclosure or extender card) to output Ethernet signals rather than PCIe signals in accordance with the reference clock provided to the data card. The new data card signals would thus be synchronized to the new reference clock.

In some embodiments, after determining the two sets of clock frequencies the data card signals that are being repurposed are converted to the new data card signals compliant with the second signalling standard by providing it with a clock frequency from the second set, without attempting to determine a common frequency or seeking a frequency near one or more of the reference clock frequencies in the first set.

In some embodiments, a host interface connector, in particular, may be repurposed from a PCIe signaling standard to an Ethernet signalling standard. Generally, all PCIe boards may be driven by a single PCIe standard frequency reference clock signal at 100 MHz through the PCIe interface. The PCIe links may still generally be operable at alternate frequencies such as 156.25 MHz, 161.132 Mhz and 322.265 Mhz. On the other hand, Ethernet reference clocks may typically be driven at a a set of standard Ethernet reference clock frequencies, such as 125 MHz, 322.23 Mhz, 156.25 Mhz, 312.5 Mhz, for 10G Ethernet or 390.625 Mhz for 25 Gbps Ethernet, that is different from the standard PCIe reference clock. Therefore, to repurpose PCIe links as Ethernet links, a reference clock with a frequency corresponding to a recognized Ethernet reference clock frequency that also works with PCIe may be provided to the PCIe card. Generally, this reference clock frequency may be provided from a clock source (e.g. oscillator) external to the PCIe data card. In some embodiments, however, it may also be possible to provide this reference clock signal using a clock signal source available on the PCIe card.

In embodiments where the data card is a FPGA board and a reference clock is on the FPGA board, changing the reference clock may involve reprograming the FPGA to reconfigure the reference clock on the FPGA. However, in other embodiments, reconfiguring a reference clock on a data card may require obtaining the reference clock from a feed clock external to the data card. For a PCIe compliant data card, the feed clock may be provided by the enclosure 10 or data card extender 90 via the PCIe interface. The feed clock signal and the data card signals can be provided in separate signal lines (i.e. not provided on the same signal line). However, in other embodiments, the feed clock signal and the data card signals may be combined into the same signal line using various methods such as signal encoding or multiplexing.

Although host interface connections such as PCIe connections often have internal or incorporated clock sources, in some embodiments, the reference clock or other parameters for defining the signalling standard for one or more of the data card connections or host interface connections may be provided external to the data card, such as by the enclosure or data card extender. In such embodiments no configuration of the data card may be needed. Instead, signalling parameters such as a reference clock may be provided to connections, such as host interface connections, compliant with an Ethernet signaling standard.

For example, in some embodiments an enclosure may be used and may be equipped with an oscillator to generate a PCIe reference clock for a data card under normal operating conditions through a dedicated reference clock line in the PCIe interface as dictated by the PCIe standard. The frequency of the clock may be controllable electronically so that a range of clock frequencies can be produced. For instance, the oscillator may be a voltage controlled oscillator coupled to a voltage source so the output frequency corresponds to the input voltage.

In some embodiments, a host data processor, such as the host data processor disclosed above in relation to the enclosure, may provide an interface for a user to monitor and control operational parameters of the data card (e.g. instruct the data card to generate signals according to the new standard) and signal line. In some embodiments, this interface may enable a user to adjust an oscillator providing the PCIe reference. The adjustment may be controllable by a user via the interface so that the user may select the desired data card connection to repurpose and also select appropriate signalling standard parameters, such as an appropriate feed clock frequency, to enable repurposing of the port. Similarly, the data card extender may provide similar functionalities in which an interface is provided for a user to monitor and control operational parameters of the data card.

In some embodiments a host data processor may enable a user to indicate a command, such as a "pcie clock-profile" command, which may enable a user to set a PCIe reference clock embedded in the PCIe connectors. For example, while a PCIe reference clock signalling standard may require 100 MHz, a user may reconfigure this frequency for a particular connector to clock frequencies compatible with other protocols, such as Ethernet protocols. In some embodiments, predefined clock configurations may be available from which a user may choose. In some embodiments, these configurations may correspond to the most commonly used reference clock profiles on commercially available boards. In some embodiments, provided clock configurations may include one or more of 156.25 ppm-156.25 Mhz clock with 50 ppm precision, 161.132 ppm-161.132 Mhz clock with 50 ppm precision, 322.265 ppm-322.265 MHz clock with 50 ppm precision, 100 Mhz-PCIe reference clock at 100 Mhz, 50 ppm precision, 156.25 ppb-156.25 Mhz with 10 ppb precision, and 161.132 ppb-161.132 Mhz with 10 ppb precision.

In some embodiments involving a data card extender, the data card extender may comprise an on-board oscillator or host data processor. In such embodiments an arrangement may be possible in which the on-board oscillator is controllable to set the desired reference clock so as to repurpose a connector.

The present invention has been described here by way of example only. Various modification and variations may be made to these exemplary embodiments and aspects without departing from the spirit and scope of the invention, which is limited only by the appended claim.

The invention claimed is:

1. A method of using a signal line of a data card, the signal line being configured to carry data card signals provided by the data card, the data card signals being compatible with a first signalling standard, the method comprising:
    determining an external device for connecting to the data card using the signal line, the external device being configured to provide device signals compliant with a second signalling standard such that the data card signals compatible with the first signalling standard are not readable by the external device and device signals compliant with the second signalling standard are not readable by the data card when received via the signal line;
    converting the data card signals carried by the signal line to be new data card signals compliant with the second signalling standard and readable by the external device;
    connecting the signal line as a data link for communication between the data card and the external device; and,
    operating the signal line of the data card in compliance with the second signalling standard to carry the new data card signals such that the new data card signals communicated to the external device are compliant with the second signalling standard and are readable by the external device;
    wherein converting the data card signals carried by the signal line to the new data card signals comprises:
        determining a first set of clock frequencies compatible with the first signalling standard, the data card signals being synchronized to a signal line clock frequency within the first set of clock frequencies;
        determining a second set of clock frequencies compliant with the second signalling standard, the external device being configured to operate at a device clock frequency within the second set of clock frequencies, the device clock frequency being different from the signal line clock frequency;
        determining a reference clock frequency, the reference clock frequency being common to both the first set of clock frequencies and the second set of clock frequencies; and
        based on the reference clock frequency, converting the data card signals carried by the signal line to the new data card signals compliant with the second signalling standard.

2. The method of claim 1, wherein converting the data card signals carried by the signal line to the new data card signals comprises selecting a frequency i) common to both the first set of clock frequencies and the second set of clock frequencies, and ii) closest to the signal line clock frequency, to be the reference clock frequency.

3. The method of claim 1, wherein converting the data card signals carried by the signal line to the new data card signals comprises connecting to the data card a feed clock external to the data card to synchronize the new data card signals to reference clock frequency.

4. The method of claim 3, wherein the signal line comprises a PCI Express signal line and the first signalling standard is PCI Express for high-speed data bus communication between the data card and a host device.

5. The method of claim 4, wherein the feed clock is connected to the data card through a PCI Express interface that connects the data card and the host device.

6. The method of claim 4, wherein the second signaling standard is Ethernet.

7. The method of claim 1 wherein converting the data card signals carried by the signal line to be the new data card signals compliant with the second signalling standard and readable by the external device comprises configuring a field-programmable gate array (FPGA) provided on the data card to convert the data card signals to the new data card signals compliant with the second signalling standard.

8. The method of claim 1, wherein
    the external device is an Ethernet-compliant device being driven by an external device reference clock operating at an Ethernet frequency;
    the second signalling standard is, and the first signalling standard is not, an Ethernet signalling standard;
    the data card signals according to the first signalling standard are synchronized to a signal line clock frequency different from the Ethernet frequency; and,
    converting the data card signals carried by the signal line to the new data card signals comprises converting the signal line clock frequency to the Ethernet frequency to synchronize the new data card signals to the Ethernet frequency.

9. A method of using a signal line of a data card, the signal line being configured to carry data card signals provided by the data card, the data card signals being compatible with a first signalling standard, the method comprising:
    determining an external device for connecting to the data card using the signal line, the external device being configured to provide device signals compliant with a second signalling standard such that the data card signals compatible with the first signalling standard are not readable by the external device and device signals compliant with the second signalling standard are not readable by the data card when received via the signal line;
    converting the data card signals carried by the signal line to be new data card signals compliant with the second signalling standard and readable by the external device;
    connecting the signal line as a data link for communication between the data card and the external device; and,
    operating the signal line of the data card in compliance with the second signalling standard to carry the new data card signals such that the new data card signals communicated to the external device are compliant with the second signalling standard and are readable by the external device;
    wherein converting the data card signals carried by the signal line to be new data card signals comprises:
        for each signal line in a plurality of signal lines provided by the data card that is configured to be compatible with a corresponding signalling standard, determining, a corresponding first set of clock frequencies compatible with the corresponding signalling standard and a corresponding signal line frequency within the first set of clock frequencies used for that signal line;
        determining a second set of clock frequencies compliant with the second signalling standard, the external device being configured to operate at a device clock frequency within the second set of clock frequencies;

selecting the signal line out of the plurality of signal lines, the signal line being selected based on a respective first set of clock frequencies and the device clock frequency;

determining a reference clock frequency, the reference clock frequency being common to both the respective first set of clock frequencies and the second set of clock frequencies; and based on the reference clock frequency, converting the data card signals carried by the signal line to the new data card signals compliant with the second signalling standard.

10. The method of claim 9, wherein converting the data card signals carried by the signal line to the new data card signals comprises selecting a frequency i) common to both the first set of clock frequencies and the second set of clock frequencies, and ii) closest to the signal line clock frequency, to be the reference clock frequency.

11. A device for using a signal line in a plurality of signal lines of a data card, the device comprising:

at least one data card attachment for connecting to the signal line in the plurality of signal lines of the data card, and for connecting the signal line to an external device; and a signal generator for generating a configuration signal, provided to the data card via the at least one data card attachment, to configure the data card to communicate with the external device through the signal line; and a user interface electronically linked to the at least one data card attachment for receiving an input from a user of the data card to control the signal generator;

wherein:

the data card is configured to operate the signal line at a signal line frequency within a first set of clock frequencies;

the external device is configured to operate at a device clock frequency within a second set of clock frequencies;

the user interface comprises a frequency control for determining the configuration signal provided to the data card via the at least one data card attachment to adjust the signal line clock frequency to correspond to a reference clock frequency, the reference clock frequency being a clock frequency common to both the first set of clock frequencies and the second set of clock frequencies; and the signal generator is a clock source operable to generate the configuration signal, the configuration signal being a feed clock signal providable to the data card via the at least one data card attachment, and the clock source being adjustable to provide the feed clock signal at a plurality of different clock source frequencies including the reference clock frequency.

12. The device of claim 11, wherein the signal line comprises a PCI Express signal line and the first signalling standard is PCI Express for high-speed data bus communication between the data card and a data card host; and the at least one data card attachment comprises i) a PCI Express interface for connecting to the PCI Express signal line; and ii) a feed clock signal line separate from the PCI Express signal line for providing the feed clock signal to the data card.

13. The device of claim 11, further comprising an interface electronically linked to the external device for determining a second signalling standard, the external device being configured to provide and read signals compliant with the second signalling standard, the interface being further electronically linked to control the signal generator, wherein the interface is operable to automatically determine the second signalling standard from the external device, and to control the signal generator to generate the configuration signal based on the second signalling standard.

14. The device as defined in claim 11, wherein the external device is an Ethernet-compliant device being driven by an external device reference clock operating at an Ethernet frequency;

the configuration signal is a feed clock signal providable to the data card via the at least one data card attachment; and the signal generator is a clock source operable to generate the feed clock at a frequency corresponding to the Ethernet frequency to enable communication between the data card and the external device.

15. The device as defined in claim 11, wherein the at least one data card attachment comprises a data card receptacle provided on a first edge of a data card extender, the data card has at least one data card extender port disposed on a second edge that is oriented at least 80° relative to the first edge, and the data card receptacle is operable to connect to a set of signal lines associated with a plurality of edge connectors of the data card.

16. The device as defined in claim 15, wherein the data card extender couples the at least one data card extender port to a set of outgoing signal lines in the set of signal lines associated with the data card edge connectors such that all remaining signal lines in the set of signal lines associated with the data card edge connectors are selectable as the signal line used for the data card to communicate with the external device.

17. The device as defined in claim 11, wherein:

the first set of clock frequencies is defined by a first signaling standard;

the second set of clock frequencies is defined by a second signaling standard; and the reference clock frequency is defined by the second signaling standard.

18. A device for using a signal line in a plurality of signal lines of a data card, the device comprising:

at least one data card attachment for connecting to the signal line in the plurality of signal lines of the data card, and for connecting the signal line to an external device; and a signal generator for generating a configuration signal, provided to the data card via the at least one data card attachment, to configure the data card to communicate with the external device through the signal line;

wherein the at least one data card attachment is provided in an interior space of a data card enclosure, the at least one data card attachment is connected to at least one external communication port on an exterior of the enclosure such that the external device is connected to the signal line via a corresponding external communication port and a corresponding data card attachment.

* * * * *

UNITED STATES PATENT AND TRADEMARK OFFICE
CERTIFICATE OF CORRECTION

| | |
|---|---|
| PATENT NO. | : 10,268,847 B2 |
| APPLICATION NO. | : 15/493863 |
| DATED | : April 23, 2019 |
| INVENTOR(S) | : Sergey Sardaryan et al. |

Page 1 of 1

It is certified that error appears in the above-identified patent and that said Letters Patent is hereby corrected as shown below:

In the Claims

Column 21, Claim 11, Line 24: delete the word "and".

Signed and Sealed this
Second Day of July, 2019

Andrei Iancu
*Director of the United States Patent and Trademark Office*